(12) United States Patent
Ozsoylu et al.

(10) Patent No.: US 7,293,626 B2
(45) Date of Patent: Nov. 13, 2007

(54) APPARATUS AND METHOD FOR STEERING A VEHICLE

(75) Inventors: Suat Ali Ozsoylu, Rochester Hills, MI (US); Matthew Harvey Jimkoski, Freeland, MI (US); Michael Richard Pyrett, Flint, MI (US); William F. Feriend, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 209 days.

(21) Appl. No.: 11/016,039

(22) Filed: Dec. 17, 2004

(65) Prior Publication Data

US 2005/0098376 A1 May 12, 2005

Related U.S. Application Data

(60) Continuation-in-part of application No. 10/765,731, filed on Jan. 26, 2004, now abandoned, which is a continuation of application No. 10/262,751, filed on Oct. 1, 2002, now Pat. No. 6,705,423, which is a division of application No. 09/920,181, filed on Aug. 1, 2001, now Pat. No. 6,488,115.

(60) Provisional application No. 60/540,643, filed on Jan. 30, 2004.

(51) Int. Cl.
  *B62D 5/04* (2006.01)

(52) U.S. Cl. ............... 180/444; 64/89.23; 64/89.36

(58) Field of Classification Search ............... 180/444; 74/89.23, 89.36; 384/37
See application file for complete search history.

(56) References Cited

U.S. PATENT DOCUMENTS

| 637,204 A | 11/1899 | Heath |
| 1,234,779 A | 7/1917 | Ljungberg |
| 1,284,827 A | 11/1918 | Vorraber |
| 1,321,417 A | 11/1919 | Carlborg et al. |
| 4,223,254 A | 9/1980 | Adams ..................... 318/2 |

(Continued)

*Primary Examiner*—Kevin Hurley
(74) *Attorney, Agent, or Firm*—Michael D. Smith

(57) ABSTRACT

A steering system for a vehicle may include a load displacement system allowing transient loads of the steering mechanism to be displaced. The steering system may also include a first coupling mechanism coupling an electric motor to a rack housing, and a second coupling mechanism coupling a ball nut to a rack. A method for providing an actuation force to a rack of a vehicle includes isolating non-axial loads from an electric motor of a steering system and isolating non-axial loads from a linearly actuatable member of a rotary-to-linear conversion device in the steering system. An actuator for a steering system may include a rotary to linear actuator, a movable linear section, and an interface between the rotary to linear actuator and the linear section. The interface may include one or more cylindrical joints, revolute joints, compliant members, or a block on a plane wherein the total degrees of freedom for the system including the rotary to linear actuator, rack, and interface may be one, while the interface may be limited to three degrees of freedom.

22 Claims, 29 Drawing Sheets

U.S. PATENT DOCUMENTS

| | | | |
|---|---|---|---|
| 4,415,054 A * | 11/1983 | Drutchas | 180/444 |
| 4,651,840 A | 3/1987 | Shimizu et al. | 180/79.1 |
| 4,664,211 A | 5/1987 | Oshita et al. | 180/142 |
| 4,681,182 A | 7/1987 | Suzuki et al. | 180/79.1 |
| 4,686,433 A | 8/1987 | Shimizu | 318/50 |
| 4,719,396 A | 1/1988 | Shimizu | 318/432 |
| 4,730,686 A | 3/1988 | Shimizu | 180/79.1 |
| 4,742,882 A | 5/1988 | Shimizu et al. | 180/79.1 |
| 4,751,978 A | 6/1988 | Drutchas et al. | 180/142 |
| 4,754,829 A | 7/1988 | Shimizu | 180/79.1 |
| 4,765,426 A | 8/1988 | Shimizu | 180/79.1 |
| 4,771,845 A | 9/1988 | Shimizu | 180/79.1 |
| 4,785,901 A | 11/1988 | Maeda | 180/142 |
| 4,794,997 A | 1/1989 | North | 180/79.1 |
| 4,819,170 A | 4/1989 | Shimizu | 364/424.05 |
| 4,825,972 A | 5/1989 | Shimizu | 180/79.1 |
| 4,837,692 A | 6/1989 | Shimizu | 364/424.05 |
| 5,247,441 A | 9/1993 | Serizawa et al. | 364/424.05 |
| 5,251,135 A | 10/1993 | Serizawa et al. | 364/424.05 |
| 5,347,458 A | 9/1994 | Serizawa et al. | 364/424.05 |
| 5,732,791 A | 3/1998 | Pinkos et al. | 180/444 |
| 5,738,181 A * | 4/1998 | Kato | 180/400 |
| 5,991,675 A | 11/1999 | Asanuma | 701/41 |
| 6,006,854 A | 12/1999 | Nakajima | 180/446 |
| 6,041,885 A | 3/2000 | Watanabe et al. | 180/444 |
| 6,298,941 B1 | 10/2001 | Spadafora | 180/422 |
| 6,389,924 B1 | 5/2002 | Ryne et al. | 74/493 |
| 6,488,115 B1 | 12/2002 | Ozsoylu et al. | 180/444 |
| 6,502,995 B1 | 1/2003 | Ozsoylu | 384/496 |
| 6,615,947 B2 | 9/2003 | Ozsoylu et al. | 180/443 |
| 6,705,423 B2 | 3/2004 | Ozsoylu et al. | 180/444 |

* cited by examiner

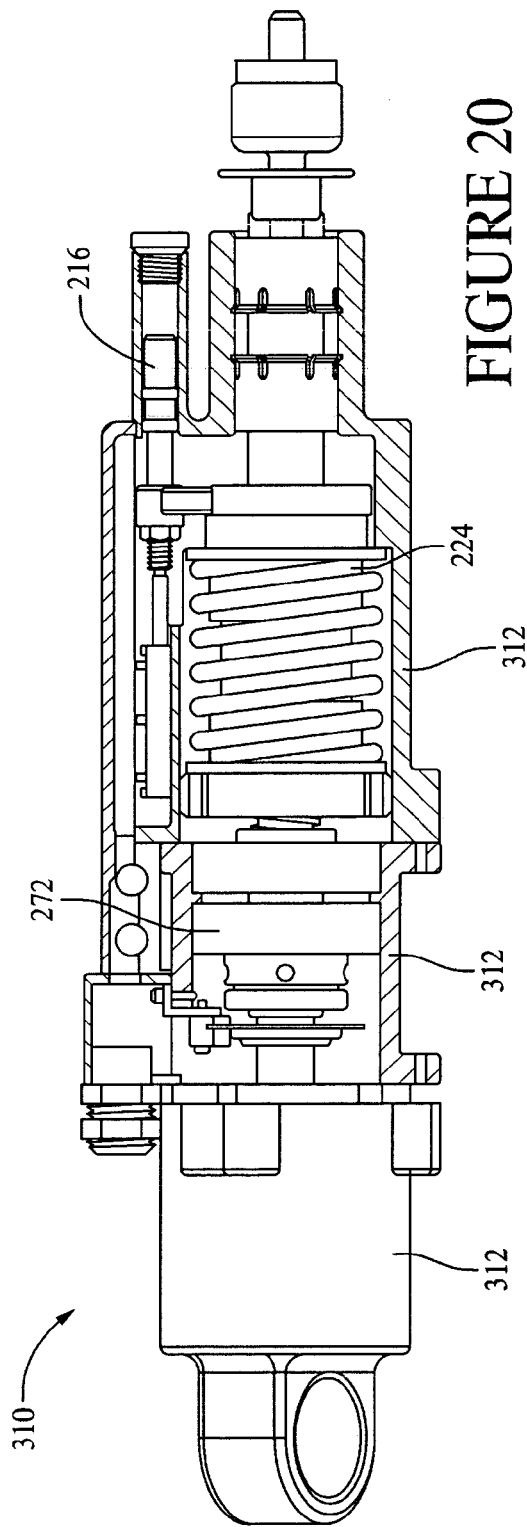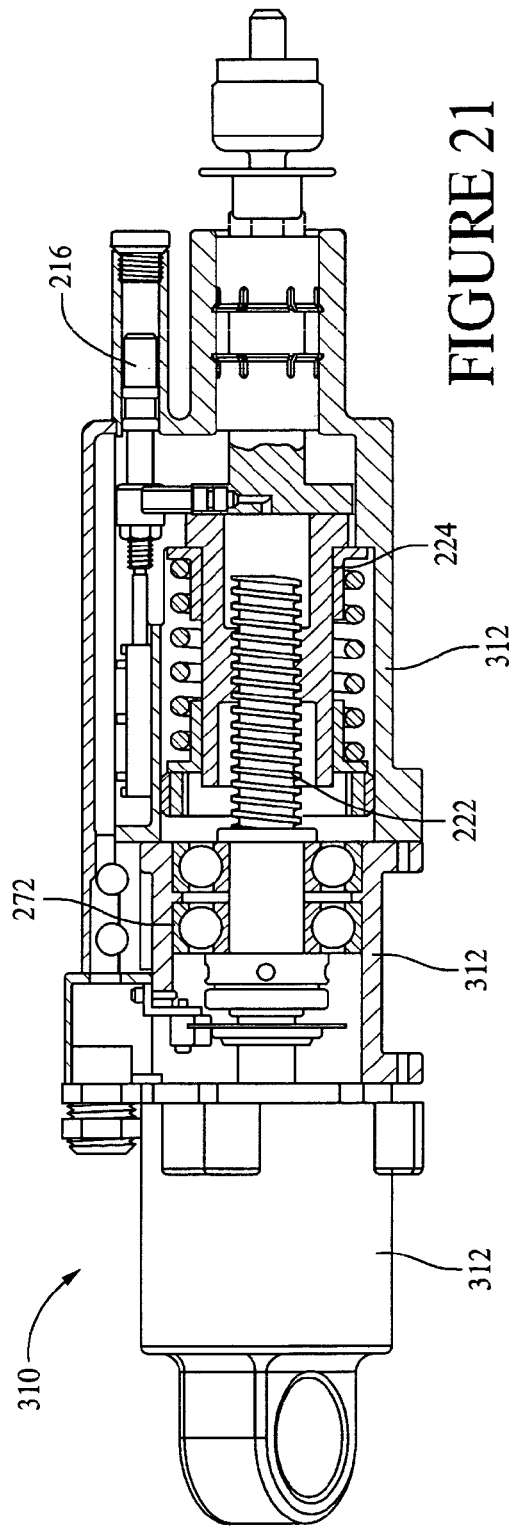

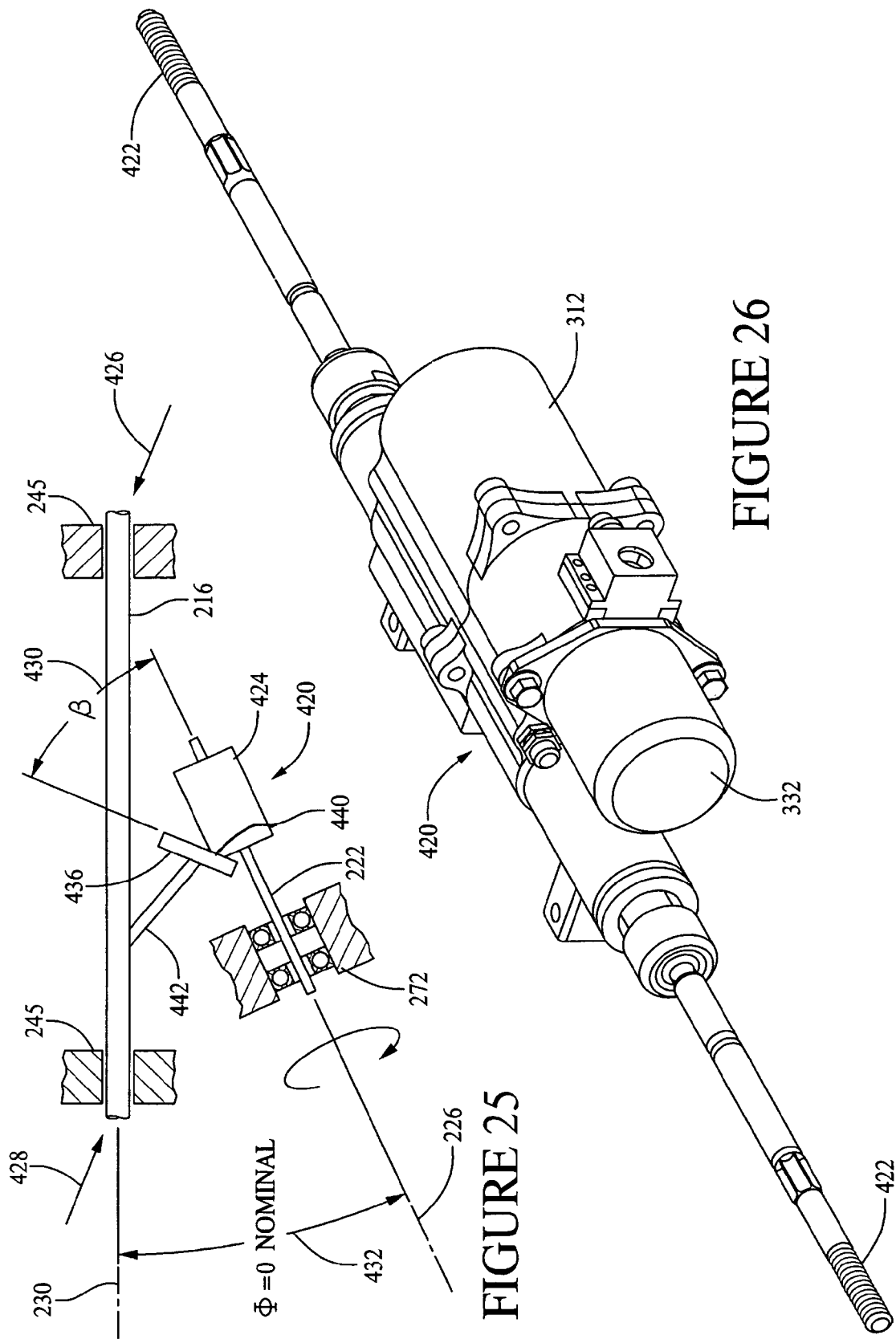

APPARATUS AND METHOD FOR STEERING A VEHICLE

CROSS REFERENCE TO RELATED APPLICATIONS

This is a continuation-in-part of U.S. patent application Ser. No. 10/765,731, filed Jan. 26, 2004 now abandoned, which is a continuation application of U.S. patent application Ser. No. 10/262,751 Oct. 1, 2002, (now U.S. Pat. No. 6,705,423), which is a divisional of U.S. patent application Ser. No. 09/920,181, filed Aug. 1, 2001 (now U.S. Pat. No. 6,488,115) which is related to U.S. patent application, Ser. No. 09/664,850, filed Sep. 19, 2000, wherein the contents of all of the above listed applications and patents are incorporated in their entirety herein by reference.

This application also claims priority to U.S. Provisional Patent Application 60/540,643 filed on Jan. 30, 2004, wherein the contents are incorporated in its entirety herein by reference.

This application is also related to U.S. patent application, Ser. No. 09/650,869, filed Aug. 30, 2000, the contents of which are incorporated herein by reference thereto.

This application is also related to U.S. patent application, Ser. No. 09/663,549, filed Sep. 18, 2000, the contents of which are incorporated herein by reference thereto.

FIELD OF THE INVENTION

This invention is related generally to steering systems, and, more particularly, this invention is related to an interface between a rotary to linear actuator and a linear section of the steering system

BACKGROUND OF THE INVENTION

Some current steering system designs have replaced the hydraulic power steering pump with electrically assisted systems based on fuel economy, modularity, engine independence, and environmental issues.

With electrically actuated or electrically assisted steering systems there is a significant servo mechanism design challenge associated with the need to maintain proper kinematical constraint, while at the same time, providing reasonable insulation from the drawbacks of tolerance stack up which may produce system lock up.

Although a successful servo mechanism design may appear to be a combination of basic "catalogue" mechanisms (e.g. ball-screw, gears, belts, various joints, etc.), the way these are used in combination represents an unmistakably cardinal feature of this art.

The current state of engineering meets these concerns by anticipating the stresses likely to be encountered by designing heavy-duty components. Needless to say, these designs are expensive to manufacture, have excessive performance challenges because of the increased inertia and friction, and add to the overall weight of the vehicle.

In most steering applications development of the actuator for power assist follows the synthesis and design of the suspension and steering linkages. Steering linkages could be steering the front wheels or rear wheels or both. Thus power assist steering may take the form of assisting front steering mechanism, rear steering mechanism or both. The steering linkage could also be connected to the steering wheel mechanically or via electronics that follow certain logic such as in "steer-by-wire" applications.

BRIEF SUMMARY OF THE INVENTION

In one exemplary embodiment, a steering system for a vehicle may include a steering wheel being positioned for manipulation by a vehicle operator, a steering mechanism for transmitting a steering operation of the steering wheel to vary the angular configuration of at least one wheel of the vehicle, a power assist mechanism for providing an assisting force to the steering mechanism, the power assist mechanism being activated in response to the steering operation of the steering wheel and a load displacement system being operatively coupled to the power assist mechanism, the load displacement system allowing transient loads of the steering mechanism to be displaced.

In another exemplary embodiment, a steering system for a vehicle includes a rack being movably mounted within a rack housing, the rack being coupled to a steerable road wheel, a ball-screw mechanism being coupled to the rack at one end and an electric motor at the other, the electric motor providing an actuating force to the ball-screw mechanism, the actuating force causing the rack to move linearly within the rack housing, a first coupling mechanism coupling the electric motor to the rack housing, and a second coupling mechanism coupling the ball nut to said rack.

In another exemplary embodiment, a method for providing an actuation force to a rack of a vehicle, includes isolating non-axial loads from an electric motor of a steering system, the motor providing a rotational force to a rotatable member of a rotary-to-linear conversion device, and isolating non-axial loads from a linearly actuatable member of said rotary-to-linear conversion device, the linearly actuatable member being coupled to a rack of said steering system.

In yet another exemplary embodiment, a steering system for a vehicle includes a rack being movably mounted within a rack housing, the rack being coupled to a steerable road wheel, a rotary-to-linear mechanism being coupled to the rack at one end and an electric motor at the other, the electric motor providing an actuating force to the rotary-to-linear mechanism, the actuating force causing the rack to move linearly within the rack housing, a first coupling mechanism coupling the electric motor to the rack housing, and a second coupling mechanism coupling the ball nut to the rack.

In another exemplary embodiment, an actuator for a steering system, may include a rotary to linear actuator, a movable linear section, and an interface between the rotary to linear actuator and the linear section, wherein the interface is limited to three degrees of freedom and the actuator is limited to one degree of freedom.

In another exemplary embodiment, an interface for an actuator may adjoin a movable linear section and a rotary to linear actuator, and the interface may comprise a block on a plane joint.

Other systems and methods according to embodiments will be or become apparent to one with skill in the art upon review of the following drawings and detailed description.

BRIEF DESCRIPTION OF THE DRAWINGS

FIGS. 20 and 21 are cross-sectional views of a system incorporating the concepts of FIG. 19;

FIG. 25 is a diagrammatic front view of an alternate interface between a rotary to linear actuator and a linear section of an actuator;

FIG. 26 is a perspective view of an actuator incorporating the mechanism of FIG. 25;

DETAILED DESCRIPTION OF THE INVENTION

Aspects of these embodiments relate generally to an apparatus and method for steering a vehicle, and more specifically to a rack-independent actuator. A steering system for a vehicle may include a rack-independent actuator. The rack-independent actuator may include component parts that isolate from undesirable loads by two universal joints that may isolate mechanical components of the actuator from transient loads that may be encountered by the rack or rack housing.

The system may be powered by a rotary type electric motor. The motor has speed reducers and rotary-to-linear actuators to achieve feasible size and linear actuation. The actuation-unit is decoupled from the directionally unwanted loads by providing universal joints (or an equivalent degree of freedoms) at either end. One universal joint is mounted to the housing that holds the motor rotary-to-rotary speed reducer and the movable shaft of the linear-to-rotary actuator, and the other is mounted to a member that is linearly moved by the linear-to-rotary actuator.

The use of universal joints (or gimbals), which provides kinematical degrees of freedom to prevent non-axial loads, also prevents bending moments on the rotary-to-linear actuator. In particular, such loads may result from the misalignment of the shafts and/or non-axial loading from other components. This situation may produce undesirable friction and high stresses resulting in loss of efficiency and/or undesirable steering feel. By avoiding the non-axial loads, the mechanization becomes feasible for all types of linear-to-rotary mechanizations, which today are limited to very special ball-screws.

Exemplary embodiments of the independent actuator system of employ the judicious use of universal joints, (gimbal) expansion joints, or other equivalents to achieve freedom from lock-up as well as compensation for reasonable tolerance stack-up errors, which must be designed around current steering system designs.

A benefit of the Electric Power Steering and Steer-by-Wire system is the enhanced comfort to the driver of a vehicle equipped with this system. The driver of such a vehicle would experience improved handling over less-than-smooth terrains e.g., potholes, graded surfaces, etc.

Less-than-smooth terrain increases the loads and deflections encountered by the steering system. Thus, any bumps experienced by the vehicle may increase the wear and tear to the steering system, thus shortening and reducing its effective life.

Figure 1:
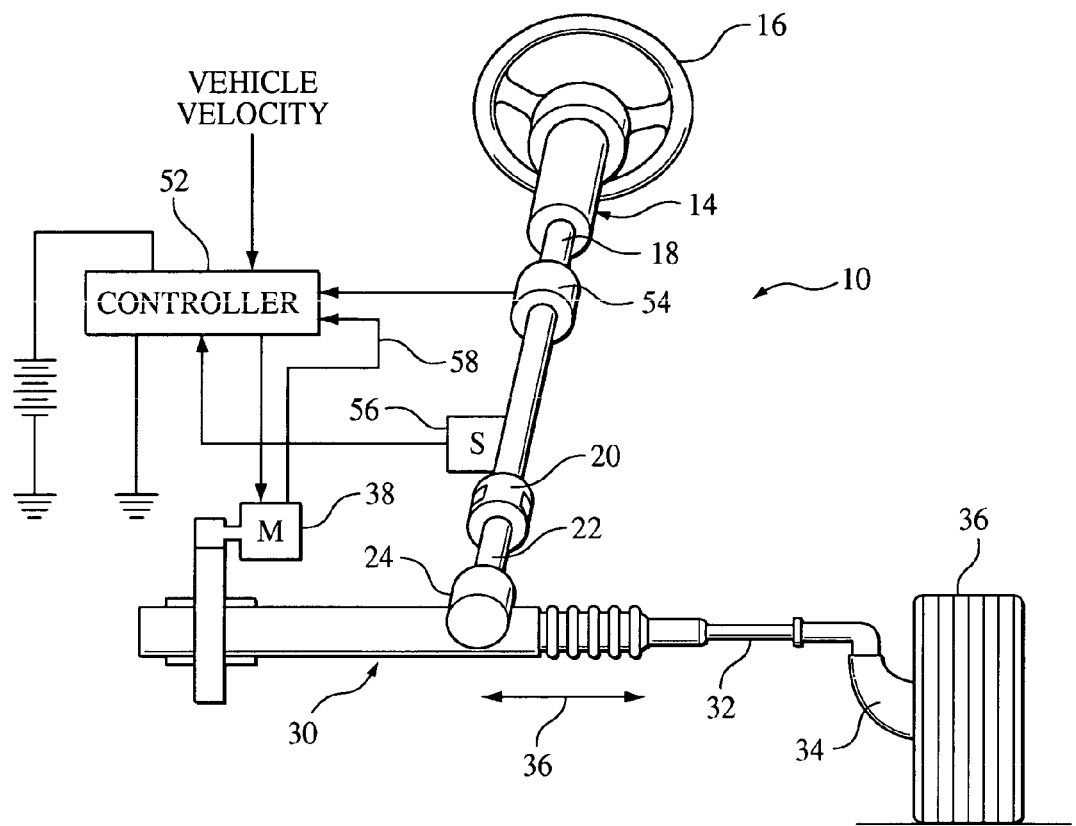
FIG. 1 shows an illustration of a steering system for a vehicle.
Figure 2:
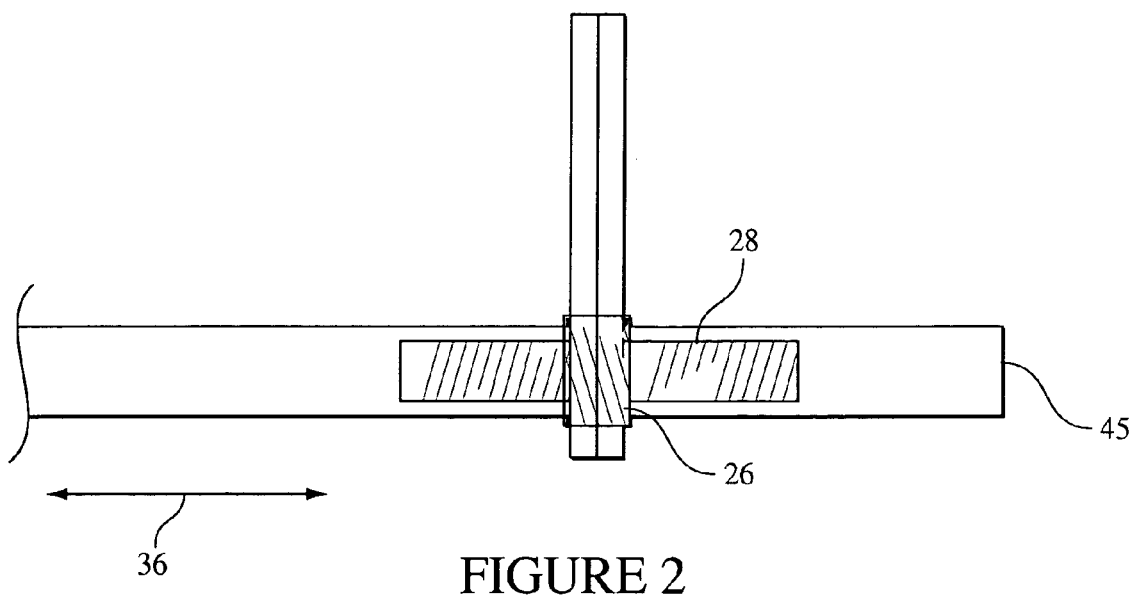
FIG. 2 is an illustration of a portion of the steering system in FIG. 1.
Figure 3:
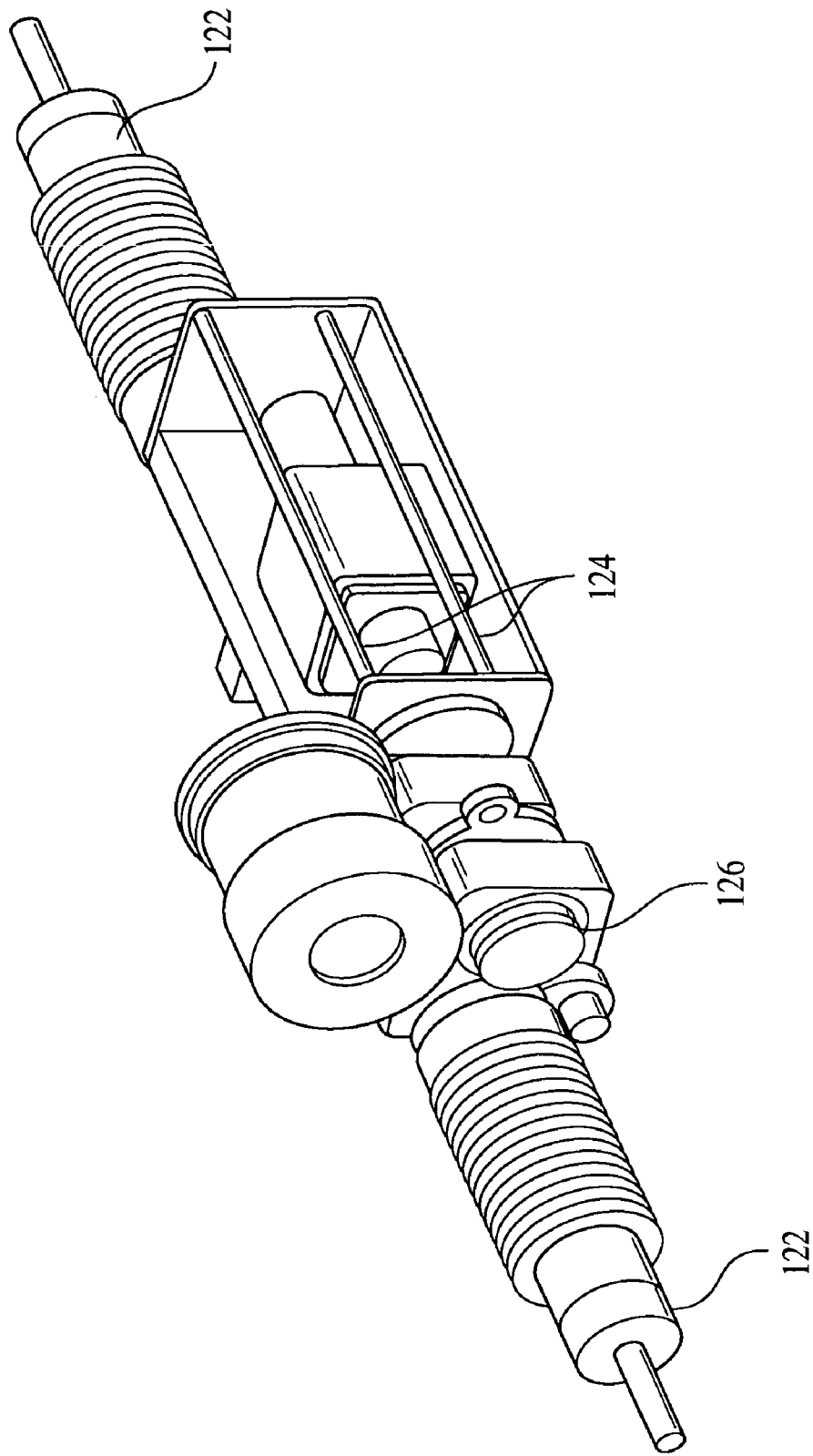
FIG. 3 is a perspective view of exemplary embodiments of a rack-independent actuator.

Referring now to FIGS. 1 and 2, a steering system 10 for use in a vehicle 12 (not shown) is illustrated. Steering system 10 allows the operator of vehicle 12 to control the direction of vehicle 12 through the manipulation of steering system 10.

A steering column 14 provides mechanical manipulation of the vehicle's wheels in order to control the direction of the vehicle. Steering column 14 includes a hand wheel 16. Hand wheel 16 is positioned so that a user can apply a rotational force to steering column 14. An upper steering column shaft 18 is secured to hand wheel 16 at one end and column universal joint 20 at the other. Column universal joint 20 couples upper steering column shaft 18 to a lower steering column shaft 22. Lower steering column shaft 22 is secured to column universal joint 20 at one end and a gear housing 24 at the other. Gear housing 24 includes a pinion gear 26 (FIG. 2). Pinion gear 26 of gear housing 24 is positioned to make contact with a matching toothed portion 28 of a rack assembly 30. Pinion gear 26 has helical teeth that are meshingly engaged with straight-cut teeth of matching toothed portion 28.

The pinion gear, in combination with the straight-cut gear teeth of the rack, form a rack and pinion gear set. The rack 45 is coupled to the vehicle's steerable wheels with steering linkage in a known manner.

Tie rods (only one shown) 32 are secured to rack assembly 30 at one end and knuckles 34 (only one shown) at the other.

As a rotational force is applied to steering column 14, through the manipulation of hand wheel 16 or other applied force, the pinion gear of gear housing 24 is accordingly rotated. The movement of the pinion gear causes the movement of rack assembly 30 in the direction of arrows 36, which in turn manipulates tie rods 32 and knuckles 34 in order to reposition wheels 36 (only one shown) of the motor vehicle. Accordingly, when the steering wheel 16 is turned, rack 45 and pinion gear 26 convert the rotary motion of the steering wheel 16 into the linear motion of rack 45.

In order to assist the user-applied force to the steering system, an electric motor 38 is energized to provide power assist to the movement of rack 45, aiding in the steering of the vehicle by the vehicle operator.

Electric motor 38 provides a torque force to a motor pulley 40 via motor shaft 42. The rotation force of motor pulley 40 is transferred to a belt 44. There are retaining walls 41 on either one of the pulleys 40 and/or ball-screw pulley 62 to help prevent belt 44 from slipping completely off. Alternatively, motor pulley 40 can be configured to have no retaining walls. In yet another alternative, belt 44 is replaced by a chain or gear system or any rotary to rotary drives that provides a rotational force to the screw 64 of the ball-screw mechanism.

Accordingly, and as a torque force is applied to the belt 44, the rotational force is converted into a linear force via the rotary-to-linear actuator (ball-screw assembly 66), and rack 45 is moved in one of the directions of arrows 36. Of course, the direction of movement of rack assembly 30 corresponds to the rotational direction of motor pulley 40. Belt 44 has an outer surface 46 and an inner engagement surface 48. The configuration belt 44 and the position of electric motor 38 allows inner engagement surface 48 of belt 44 to wrap around and engage both the motor pulley 40 and ball-screw pulley 62, that are fixed to the rotary portion of a ball-screw 66 (rotary to linear actuator) mechanism.

Electric motor 38 is actuated by a controller 52 that receives inputs from a torque sensor 54 and a rotational position sensor 56. Sensor 56 provides a steer angle signal to controller 52.

In addition, and as the motor shaft 42 of electric motor 38 turns, the motor shaft position signals of each phase are generated within electric motor 38 and are inputted into controller 52 through a bus 58.

Controller 52 also receives an input in the form of a vehicle speed signal. Accordingly, and in response to the following inputs: vehicle velocity input; operator torque input (sensor 54); steering pinion gear angle (sensor 56); and motor shaft 42 position signals (bus 58), controller 52 determines the desired electric motor's current phases and provides such currents through a bus 60.

Motor pulley 40 is rotated by motor shaft 42 of electric motor 38. A second pulley 62 is fixedly secured to the ball-screw 64 screw (or the rotary part of a rotary to linear actuator) of a ball-screw assembly 66. The ball-screw assembly 66 converts the rotary force of belt 44 into the linear movement of a ball nut 68.

Motor pulley 40 and ball-screw pulley 62 may be constructed out of a lightweight material such as aluminum or composites. This allows the overall mass and inertia of steering system to be reduced in order to improve manufacturing costs and performance, as well as vehicle fuel efficiency.

FIGS. 1 and 2 illustrate a power assist steering system that includes a mechanical connection between (rack and pinion) hand wheel 16 and rack assembly 30.

Alternatively, and in applications in which a "steer-by-wire system" is employed, there is no direct mechanical connection between hand wheel 16 and rack assembly 30. In this application, the driver's rotational movement of the hand wheel 16 (and/or signal from an equivalent driver control device such as a joystick, pedal(s) and other mechanism for manipulation by the vehicle operator) is input into the controller 52 while electric motor 38 provides the necessary force to manipulate rack assembly 30.

Referring now to FIGS. 3-14, a rack-independent actuator 70 is illustrated. In accordance with an exemplary embodiment, rack-independent actuator 70 provides the necessary force to effect the linear movement of a rack 45 coupled to the steerable wheels of a vehicle. Rack-independent actuator 70 performs the functions of rotating the steerable wheels of a vehicle in response to an input such as driver manipulation of a steering wheel. In addition, and while performing this function the rack independent actuator 70 isolates its reduction mechanisms and/or conversion mechanisms necessary to effect the rotation of the steerable wheels from transient and non-axial (to the rack) loads by a pair of universal joints 72 and 74.

Figure 16:
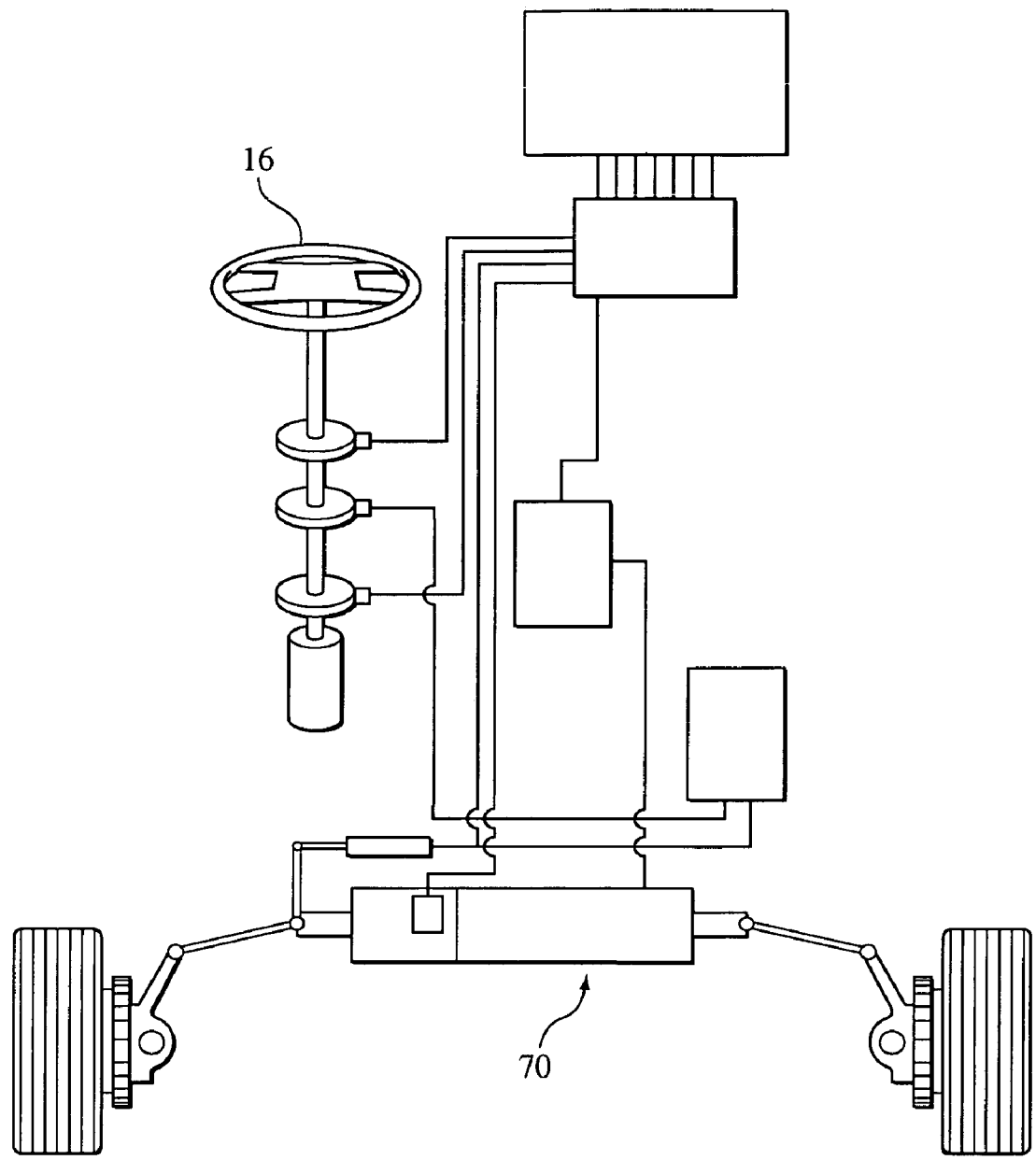
FIG. 16 a diagrammatic view of a steer by wire system.
Figure 17:
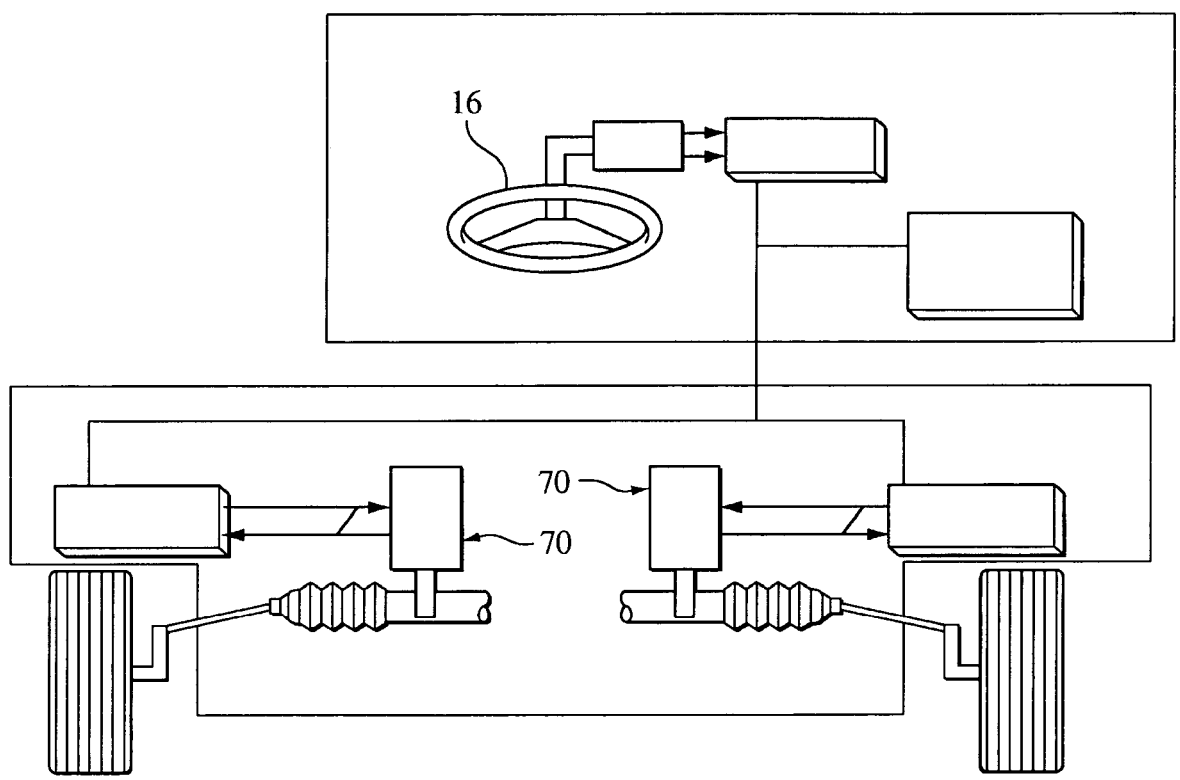
FIG. 17 is a diagrammatic view of a steer by wire system with independent actuators for each steerable wheel of a vehicle.

Rack-independent actuator 70 is also contemplated for use with a power assist steering system (FIGS. 1 and 2) and/or a "steer-by-wire system" (FIGS. 16 and 17) and/or rear wheel steering and/or four-wheel steering.

Figure 8:
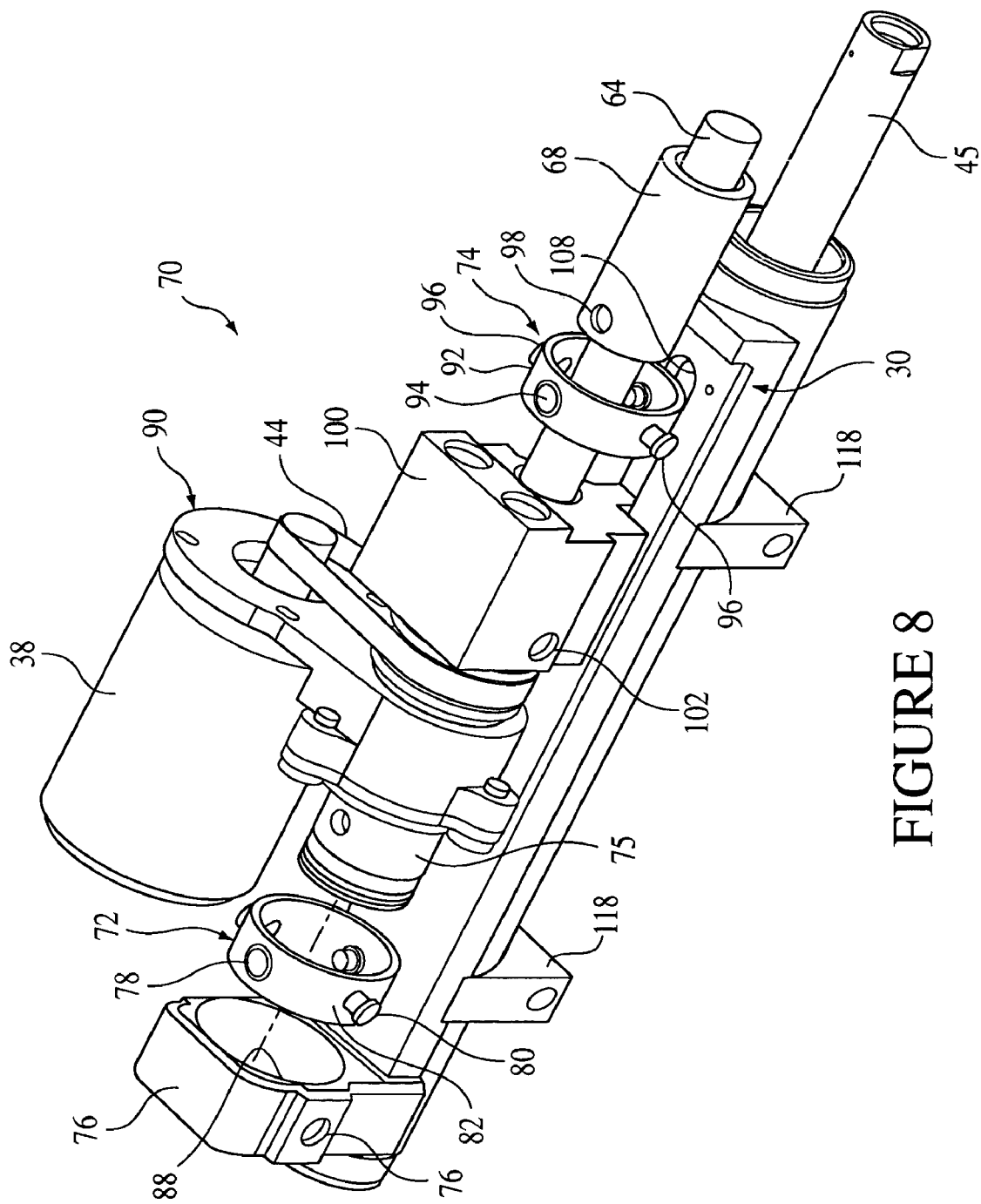
FIGS. 8 and 9 are perspective views of a rack-independent actuator illustrating the universal joints in an exploded view.
Figure 9:
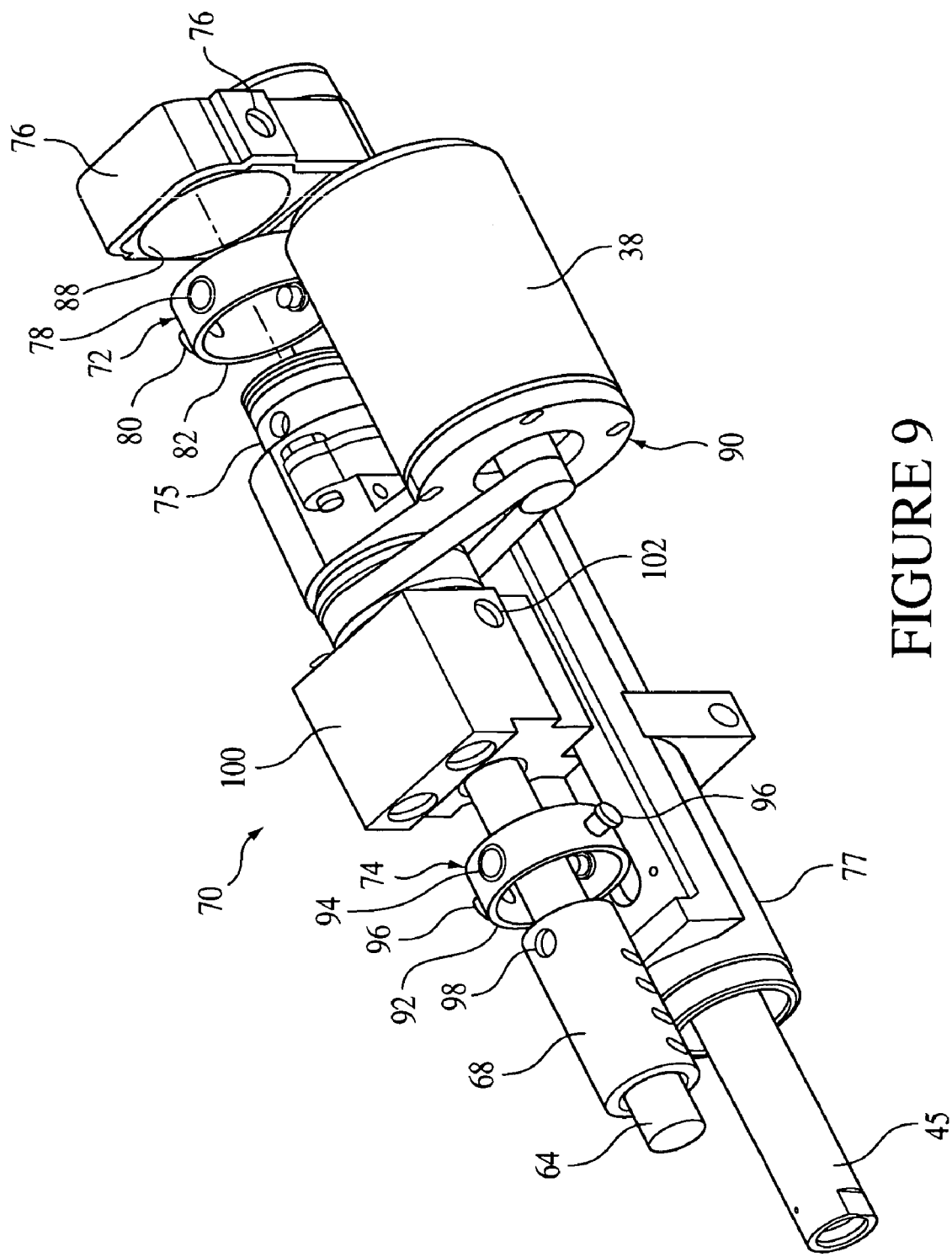
Figure 10:
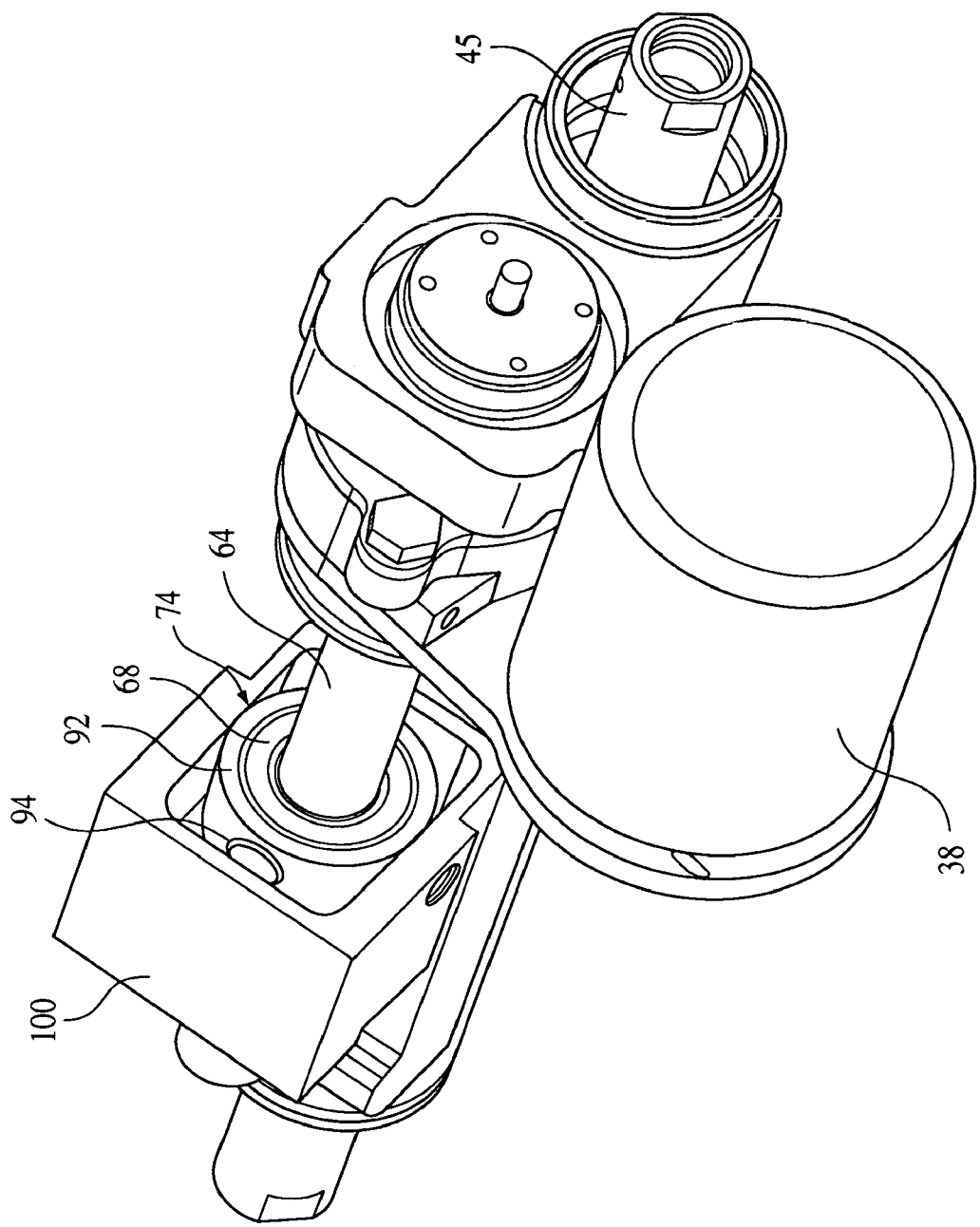
FIG. 10 is an end perspective view of exemplary embodiments of the rack-independent actuator.
Figure 11:
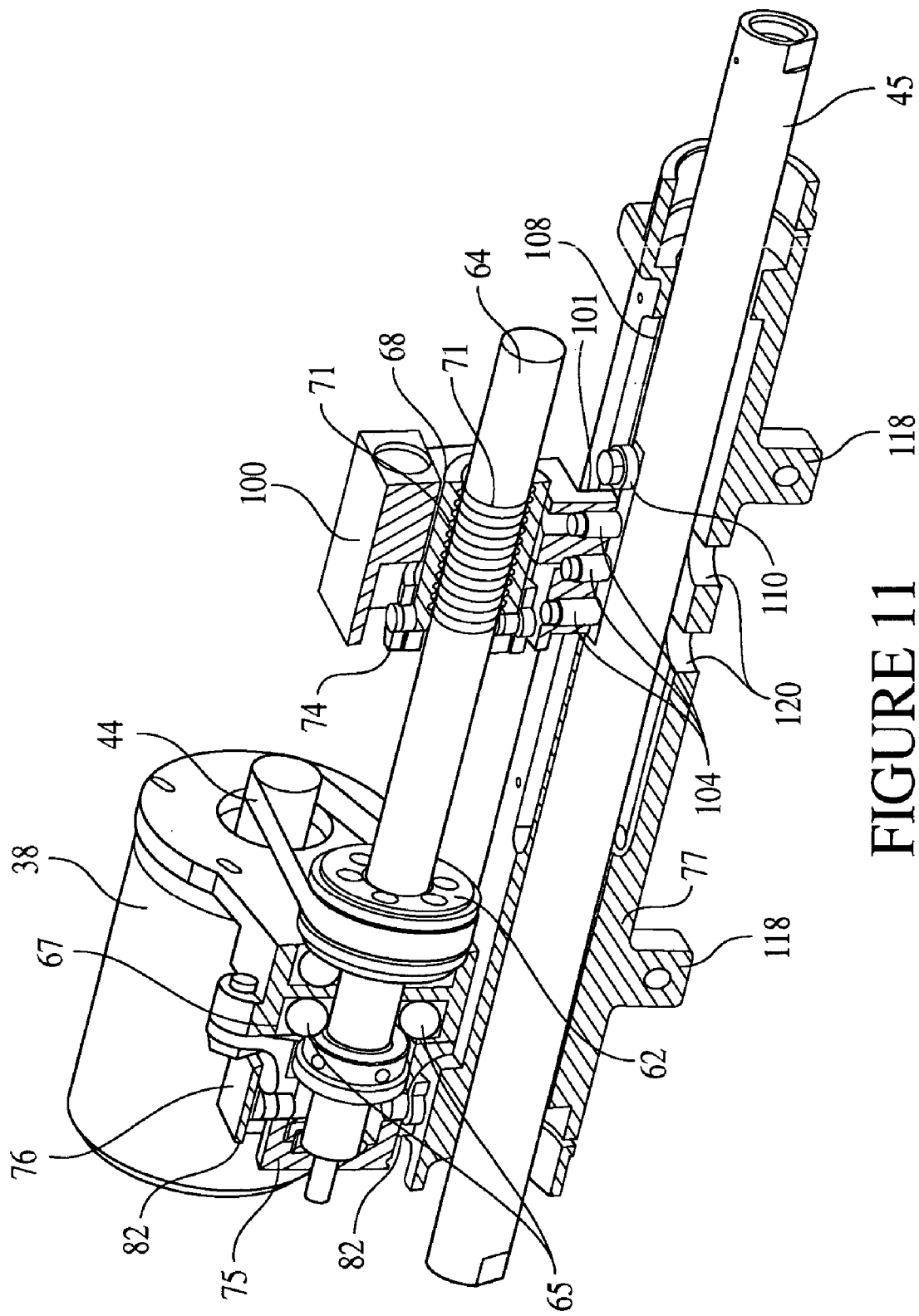
FIG. 11 is a partial cross sectional perspective view of exemplary embodiments of a rack-independent actuator.
Figure 12:
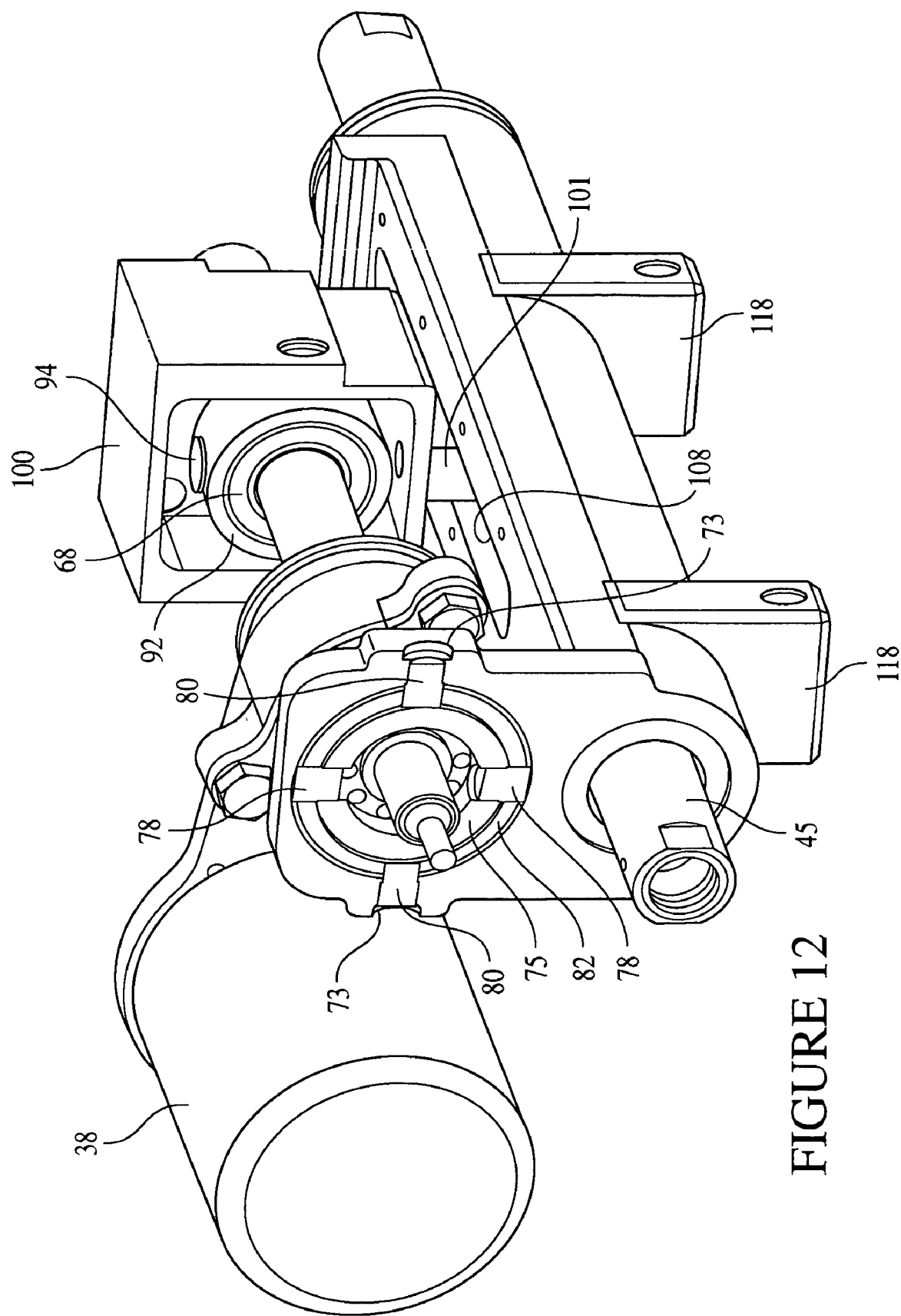
FIG. 12 is a partial cross sectional perspective view of exemplary embodiments of a universal joint of a rack-independent actuator.
Figure 13:
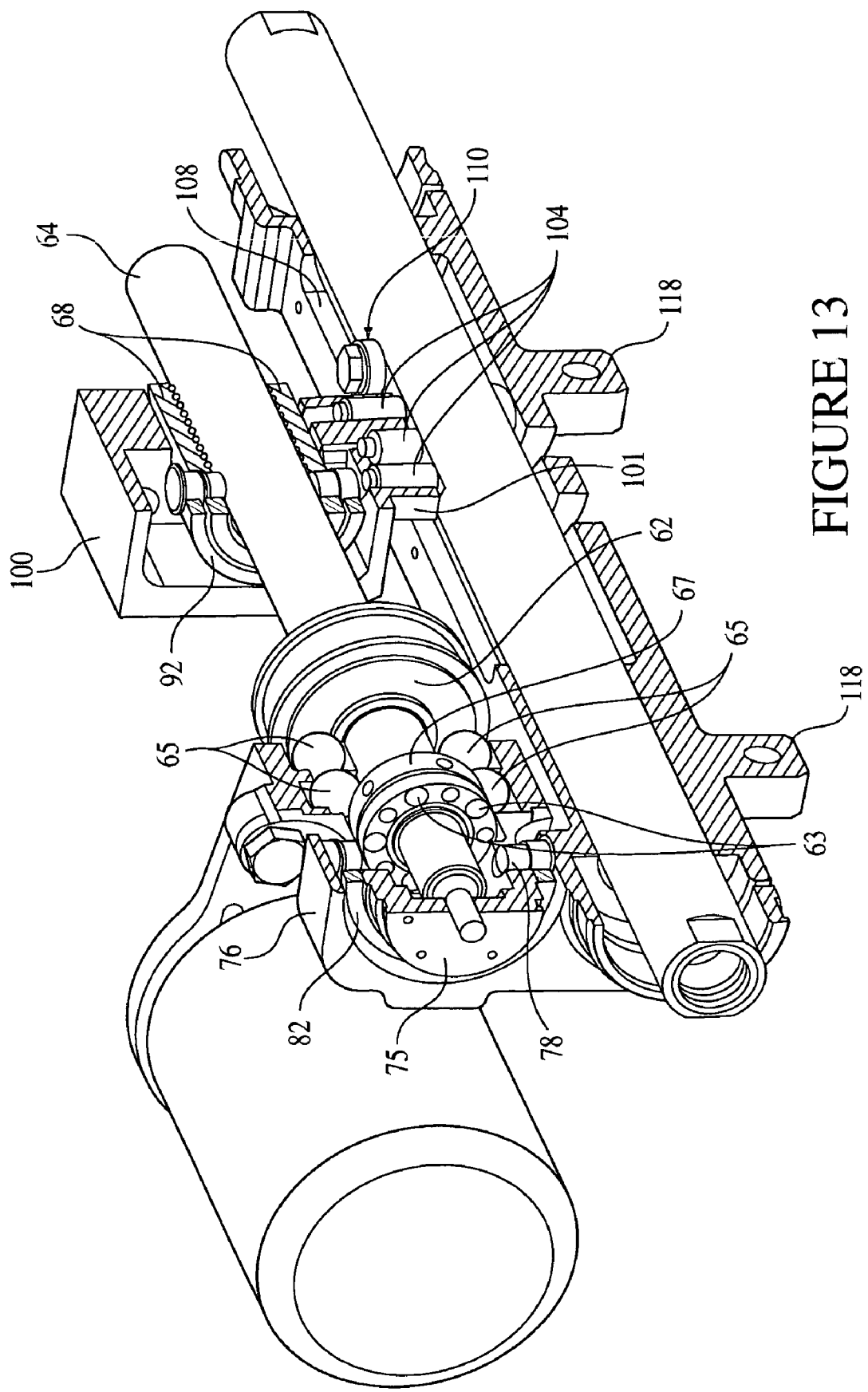
FIG. 13 is a partial cross sectional perspective view of exemplary embodiments of a rack-independent actuator.
Figure 14:
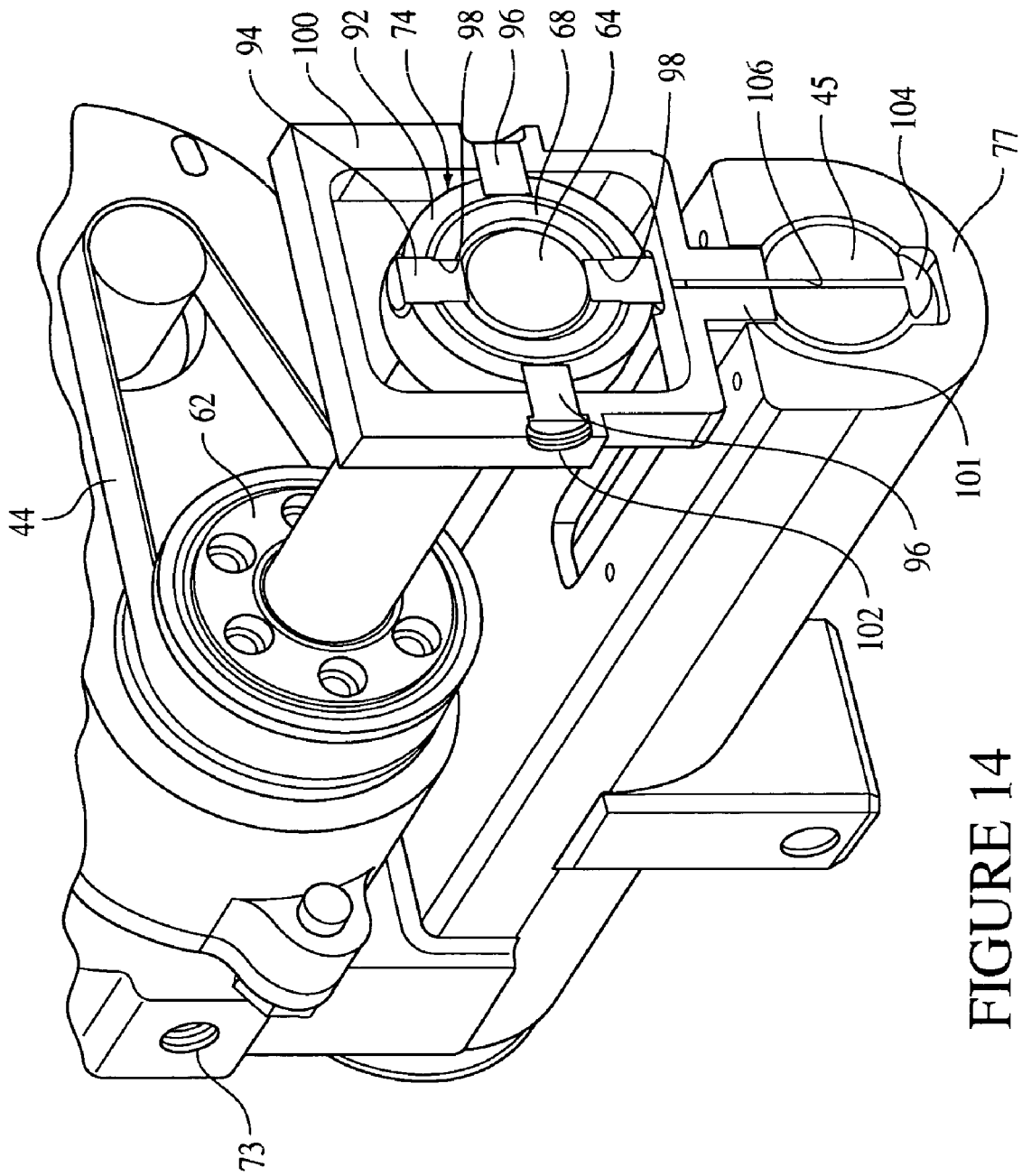
FIG. 14 is a partial cross sectional perspective view of exemplary embodiments of a universal joint of a rack-independent actuator.

FIGS. 8 and 9 illustrate universal joints 72 and 74 in an exploded view in order to illustrate the component parts of the same.

Universal joint 72 secures a housing 75 to a mounting member 76 of rack assembly 30. Universal joint 72 contains two sets of hinge pins, or pivots 78 and 80, the axis of each set being perpendicular to the other. Each set of pins is connected to the other by a central gimbal ring 82.

As an alternative, universal joints 72 and 74 may be replaced by a compliant member that allows similar degrees of freedom for the range of motion necessary to isolate the reduction mechanisms from transient and non-axial (to the rack) loads. For example, gimbal ring 82 is replaced by a rubber ring that is inserted into mounting member 76 while also covering a portion of housing 75. The rubber ring is compressible and thus capable of providing kinematic freedom. Similarly, gimbal ring 92 may be replaced by a compliant rubber ring.

In yet another alternative, rack independent actuator may be constructed with a universal joint and a rubber compliant member. For example, universal joints 72 and a rubber compliant member replacing universal joint 74 or vice versa.

In an exemplary embodiment, pins 78 and 80 are pressed at their respective openings in gimbal ring 82. This allows the rotational movement of gimbal ring 82 while also providing a means for securing the same. Alternatively, pins 78 and 80 slip in openings in housing 75 and mounting member 76.

Alternatively, pins 78 and 80 and their respective openings in gimbal ring 82, housing 75 and mounting member 76 are configured to provide a movable means of securing the same.

Pins 78 movably connect gimbal ring 82 to housing 75. In an exemplary embodiment, housing 75 is configured to have an elongated cylindrical shape allowing a portion of housing 75 to be inserted within an inner opening of gimbal ring 82. Thus, pins 78 allow gimbal ring to be movably secured to housing 75.

In addition, pins 80 movably connect gimbal ring 82 to mounting member 76. Mounting member 76 is fixedly secured to an outer housing 77 of rack assembly 30. In an exemplary embodiment, mounting member 76 defines an inner opening 88 sufficiently large enough to pass over gimbal ring 82.

Accordingly, gimbal ring 82 is movably secured to housing 75, and housing 75 is sufficiently long enough to position gimbal ring 82 within opening 88 of securement member 76, thus gimbal ring 82 connects housing 75 and securement member 76 by pins 78 and 80. Pins 78 pass through openings 73 in securement member 76 and movably secured gimbal ring 82 to securement member 76, while pins 80 movably secure gimbal ring 82 to housing 75 by engaging openings 81 in housing 75. In an exemplary embodiment, pins 78 and 80 are positioned at right angles with respect to each other. Of course, the angular positioning of pins 78 and 80 may vary as long as the intended effect of isolating potions of the rack independent actuator from unwanted loads is achieved.

For example, pins 80 prevent a load from being transferred in-between mounting member 76 and gimbal ring 82 in a first direction while pins 78 prevent a load from being transferred in-between housing 75 and gimbal ring 82 in a second direction. The first and second directions being different from each other.

As an alternative, and in order to prevent a load from being transferred to gimbal ring 82 and/or gimbal ring 92, the pins that secure the gimbal rings are covered with plastic and/or rubber to further enhance the isolation of the mechanism from unwanted loads.

Rack-independent actuator 70 has an electric motor assembly 90. Electric motor assembly 90 includes electric motor 38, rotatable shaft 42, and motor pulley 40 that is fixedly secured to motor shaft 42. As pulley 40 is rotated by motor shaft 42, belt 44 engages with pulley 40 as well as pulley 62. Since pulley 62 is fixedly secured to screw 64 of the ball-screw mechanism, the rotational movement of pulley 62 causes screw 64 of the ball-screw mechanism to rotate. Accordingly, motor 38, belt 44, pulleys 40 and 62 provide a rotary to rotary conversion, which is determined by the dimensions of pulley 40 and 62 with respect to each other (e.g. gear ratio).

As an alternative and in accordance with the exemplary embodiments, it is contemplated that other mechanisms and means for rotary to rotary conversion may be employed with the exemplary embodiments. For example, pulleys 40 and 62 and belt 44 can be replaced by a direct mechanical linkage such as a gear train rotary to rotary drive or equivalent thereof.

One end of screw 64 of the ball-screw mechanism is mounted for rotation within a plurality of bearings 65 located within housing 75 proximate to pulley 62. A pre-load nut adjuster or locking nut 67 screws onto the screw 64 of the ball-screw mechanism adjacent to bearings 65, once in position locking nut is secured to screw 64 of the ball-screw mechanism through the use of a plurality of locking screws 63 which when rotated lock locking nut 67 onto screw 64 of the ball-screw mechanism. Thus, bearings 65 are positioned between locking nut 67 and pulley 62 allowing for the rotational movement of screw 64 of the ball-screw mechanism. The other end of screw 64 of the ball-screw mechanism is rotatably supported by ball-screw nut 68 of ball-screw mechanism 66. Accordingly, the rotational movement of screw 64 of the ball-screw mechanism by motor 38 is isolated at one end by universal joint 72.

A portion of screw 64 of the ball-screw mechanism passes through ball-screw nut 68, and the respective surfaces of screw 64 of the ball-screw mechanism and ball-screw nut 68 are configured to effect the linear movement of ball-screw nut 68 as screw 64 of the ball-screw mechanism is rotated. In an exemplary embodiment, a plurality of balls 69 are received within a pair of threaded or grooved surfaces 71 positioned on the inner surface of ball-screw nut 68 and the outer surface of screw 64 of the ball-screw mechanism. The interface of screw 64 of the ball-screw mechanism and ball-screw nut 68 of ball-screw mechanism 66 are constructed in a known manner.

Accordingly, and as screw 64 of the ball-screw mechanism is rotated by the rotational movement of pulley 62 by motor 38, the rotational movement of screw 64 of the ball-screw mechanism is converted into linear movement of ball-screw nut 68. It is here that rotary to linear conversion occurs. As an alternative, other means for rotary to linear conversion are contemplated for use with the exemplary embodiments.

The interface between ball-screw nut 68 and rack 45 is isolated by universal joint 74. Ball-screw nut 68 is secured to a gimbal ring 92 of universal joint 74. Similarly to universal joint 72, universal joint 74 contains two sets of hinge pins or pivots 94 and 96, the axis of each set being perpendicular to the other. Each set of pins is connected to the other by central gimbal ring 92.

In an exemplary embodiment, pins 94 and 96 are pressed in their respective openings in gimbal ring 92. This allows the rotational movement of gimbal ring 92 while also providing a means for securing the same.

Alternatively, pins 94 and 96 and their respective openings in gimbal ring 92, ball-screw nut 68 and housing member 100 are configured to provide a movable means of securing the same.

Pins 94 movably connect gimbal ring 92 to ball-screw nut 68 allowing for movement in a first direction. In an exemplary embodiment, gimbal ring 92 is configured to have a cylindrical shape slightly larger than ball-screw nut 68, allowing a portion of ball-screw nut 68 to be inserted within gimbal ring 92. Pins 94 are received within a pair of pin openings 98 in the ball-screw nut 68. It is noted that universal joint 74 and ball-screw nut 68 are shown in FIGS. 8 and 9 in an exploded manner so as to illustrate the attachment of universal joints 72 and 74.

Pins 96 movably connect gimbal ring 92 to a housing member 100 allowing for movement in second direction, the second directional plane being orthogonal to the first directional plane. Pins 96 pass through a pair of apertures 102 in housing 100, thus movably connecting gimbal ring 92 to housing 100.

The gimbal mechanisms or in particular universal joints 72 and 74 provide the necessary kinematic degrees of freedom to prevent non-axial loads and for turning or bending moments on the ball-screw nut or screw, such as those that would result from misalignment of the shafts, from producing undesirable friction and the resultant loss of efficiency on the rotary to linear motion conversion mechanism.

In so doing, the torque output and power consumption requirements of the mechanism used to turn the ball-screw such as the electric motor is reduced. This allows the electric motor to be reduced in size as well as the components of the rotary to linear actuator. This is particularly useful for applications such as vehicular electric steering actuators, where the dynamic loads experienced by the vehicle and the requirements placed on the mechanism can significantly impact the motor and actuator mechanism requirements. The reduction in power consumption of the motor and the weight reductions associated with a smaller electric motor and mechanism represent desirable to design parameters.

Figure 4:
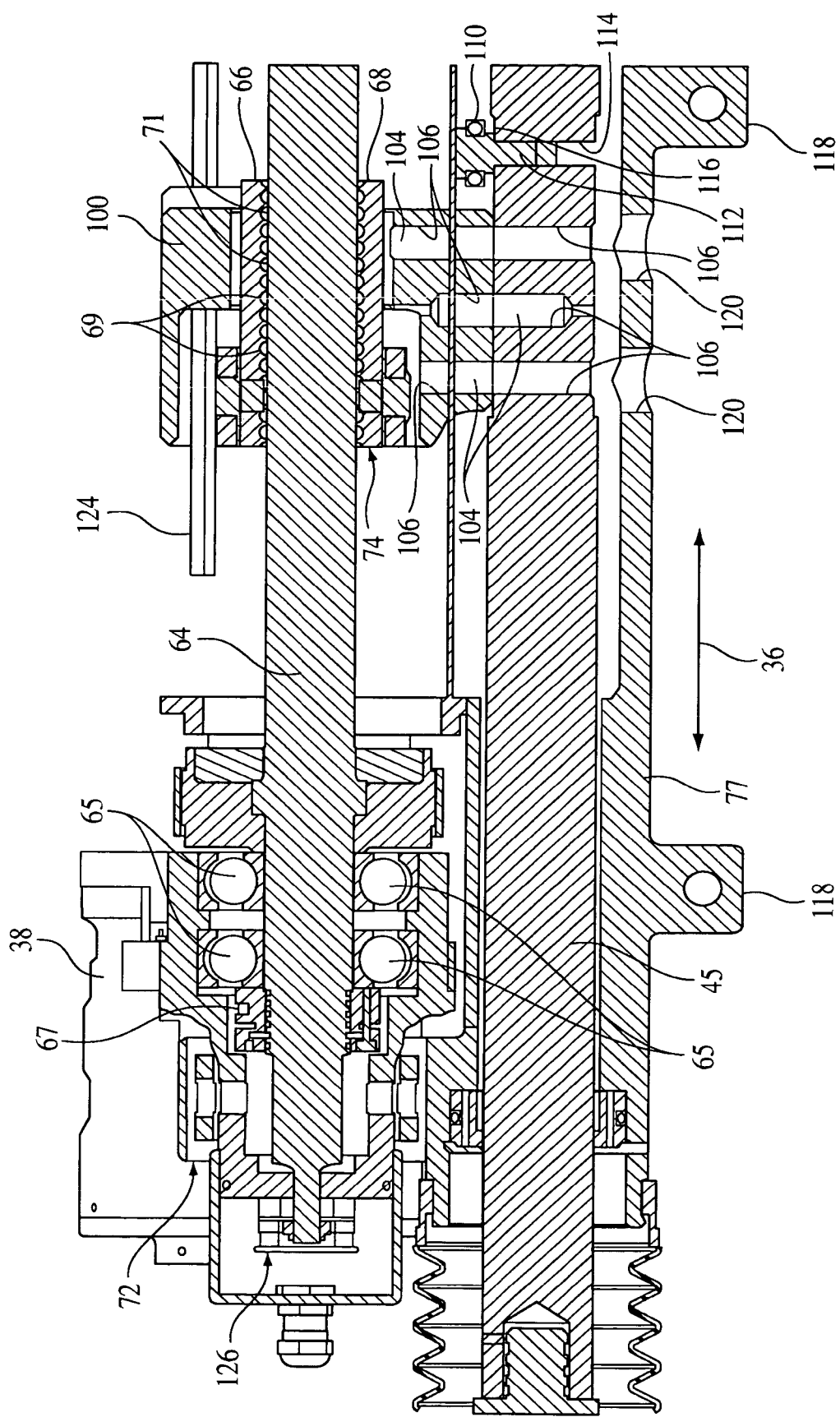
FIG. 4 is a cross-sectional view of exemplary embodiments of a rack-independent actuator.
Figure 5:
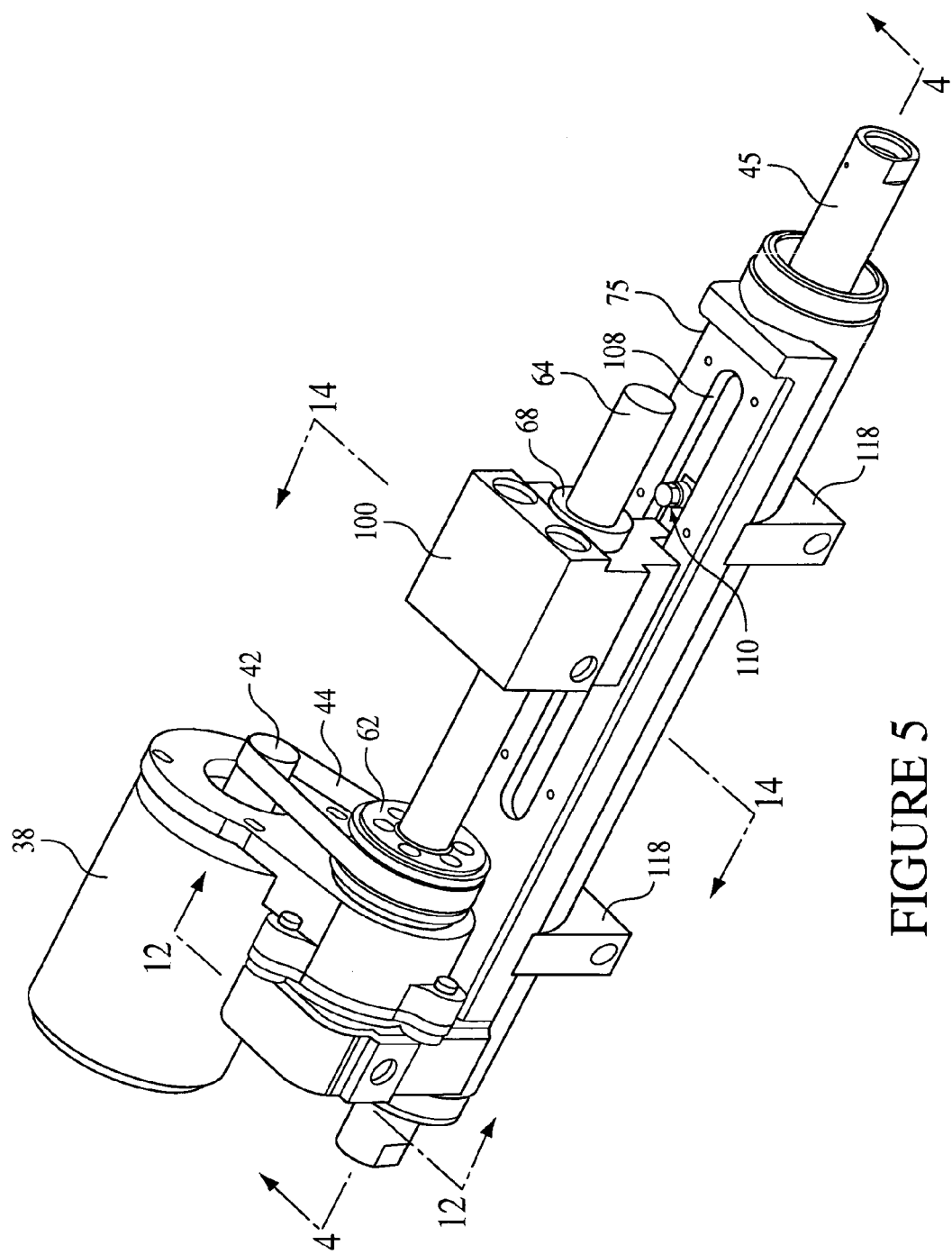
FIG. 5 is another perspective view of a rack-independent actuator.
Figure 6:
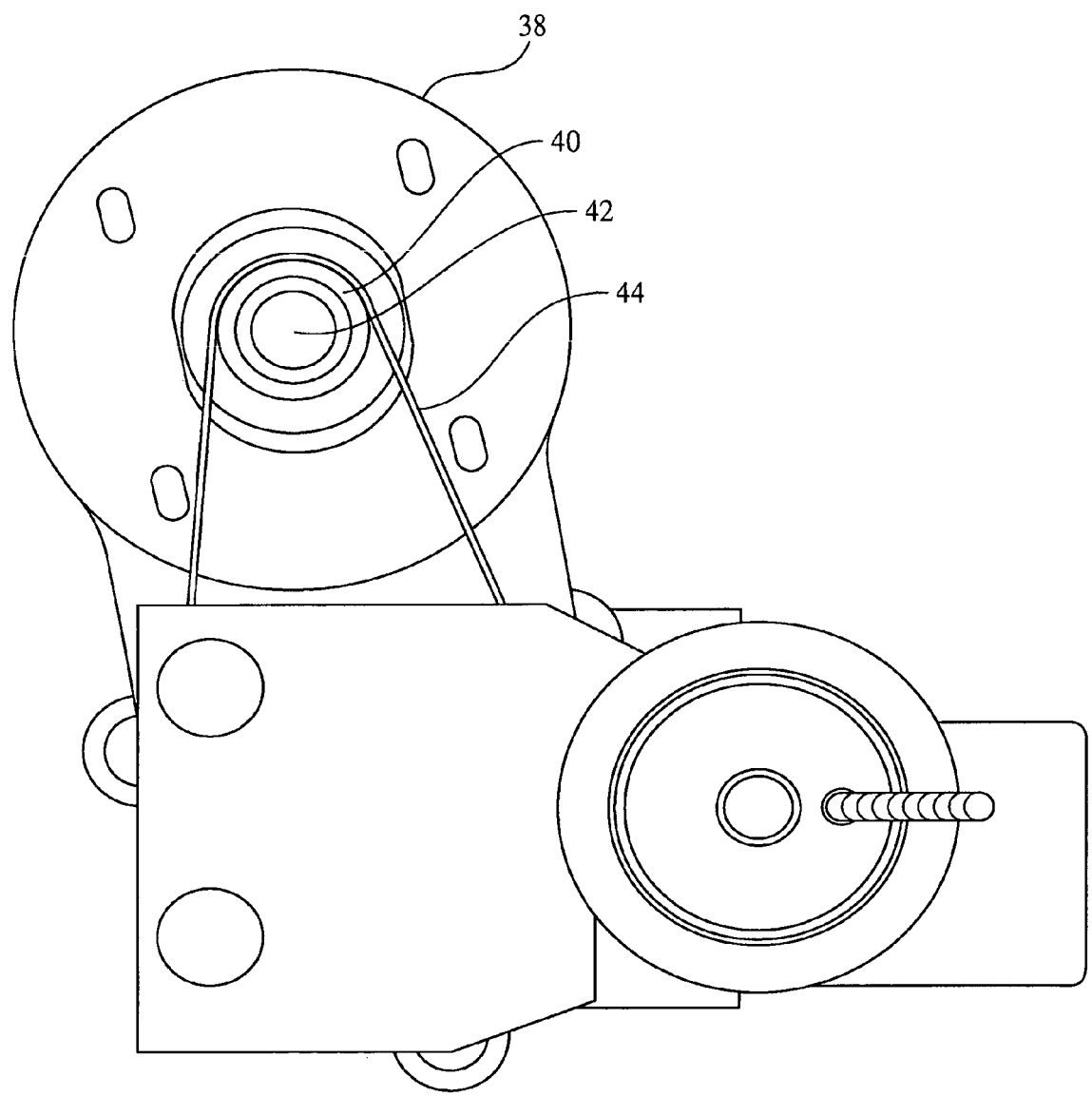
FIG. 6 is an end view of exemplary embodiments of a rack-independent actuator.
Figure 7:
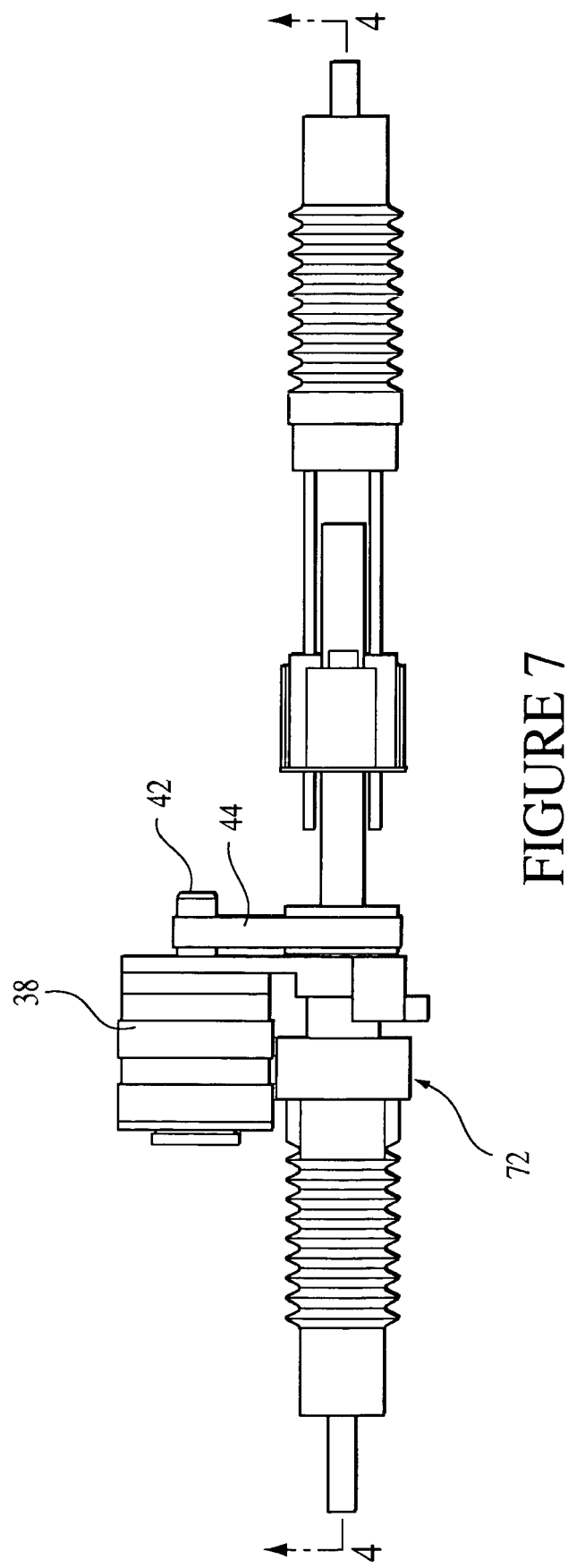
FIG. 7 is a top plan view of exemplary embodiments of a rack-independent actuator.

Referring now in particular to FIG. 4, housing 100 is fixedly secured to rack 45 through a plurality of bolts 104 which pass through complementary bolt openings 106 in rack 45 and housing 100. Accordingly, and as a rotational force is applied to screw 64 of the ball-screw mechanism, ball-screw assembly 66 converts the rotary movement of screw 64 of the ball-screw mechanism into the linear movement of ball-screw nut 68. Ball-screw nut 68 is connected to rack 45 through a universal joint 74, which is connected to ball-screw nut 68 at one end and housing 100 at the other. Housing 100 is fixedly secured to rack 45 and accordingly, as ball-screw nut 68 moves in the direction indicated by arrows 36, a similar movement of rack 45 is produced.

Housing member 100 is configured to have a mounting portion 101 that is configured to be received within opening 108. Mounting portion 101 is configured to be slidably received within opening 108 and contains the apertures into which bolts 104 are received.

Universal joints 72 and 74 isolate electric motor assembly 90 and ball-screw pulley 62 from transient non-axial loads, which may damage or misalign pulleys 40 and 62. Moreover, universal joints 72 and 74 isolate the system from undesirable loads or stack buildup that may be the result of misalignment of a component part such as rack 45, ball-screw 64 and/or any other component part that may produce an undesirable load or stack buildup.

The rack-independent actuator also allows the two pulleys on the belt and pulley mechanism to be mounted to the same housing and to eliminate all force components that could alter their parallelism.

Moreover, the rack-independent actuator of an exemplary embodiment no longer requires the motor shaft of motor 38 or the screw 64 of the ball-screw mechanism to be parallel to rack 45, as motor assembly 90 and screw 64 of the ball-screw mechanism are isolated from rack 45 through the use of universal joints 72 and 74. Thus, any misalignment of screw 64 of the ball-screw mechanism with regard to rack 45 is accommodated for by universal joints 72 and 74. Accordingly, motor shaft 42 need only be parallel to screw 64 of the ball-screw mechanism, or alternatively, pulleys 40 and 62 need only be parallel to each other. Accordingly, and since they are mounted to the same housing, this is easily achieved and maintained. Moreover, any loads that may cause misalignment are isolated from the motor assembly through the use of universal joints 72 and 74.

Also, pulleys 40 and 62 may be configured with or without retaining walls because, as stated above, belt 44 is isolated from transient forces, thus reducing belt/pulley production costs, since the belt and pulley system does not have to be designed to withstand large forces.

Referring back now to FIGS. 4, 8, 9 and 11-14, outer housing 77 of rack assembly 30 is configured to have an elongated opening 108. In order to prevent the rotational motion of the rack 45, an anti-rotation device 110 is secured to rack 45 (FIG. 4) that moves within the confinement of the elongated opening 108.

In an exemplary embodiment, anti-rotation device 110 is a plug 112 fixedly secured within an opening 114 of rack 45. Plug 112 has an upper member depending outwardly from rack 45, and is sized and configured to pass along in elongated opening 108. In addition, and in order to reduce any frictional buildup between plug 112 and the elongated opening 108, a plurality of bearings 116 are positioned around the periphery of anti-rotation device 110. Accordingly, anti-rotation device 110 prevents rotational movement of rack 45 while allowing linear movement of the same.

Rack assembly 30 is also configured to have a pair of mounting members 118. Mounting members 118 are configured to secure rack-independent actuator 70 to a vehicle frame (not shown).

In addition, and referring now to FIG. 4, housing 77 of rack assembly 30 has a pair of apertures 120. Apertures 120 are positioned to allow a tool such as a screwdriver or other type of tool to be inserted into openings 120 in order to facilitate the securement of bolts 104 to housing 100 and rack 45.

The steering system is equipped with several sensors that relay information to the electric motor 38 by way of a controller 52 (FIG. 1). Controller 52 will track the position and force upon rack 45 at all times by means of a pair of force sensors 122. Force sensors 122 provide input into controller 52 corresponding to the amount of force included at the ends of rack 45.

A pair of absolute position sensors 124 and a high-resolution sensor 126 also provide input into controller 52 in the form of a rack position location. For example, an on-center position sensor may comprise Hall-Effect devices, which are mounted within rack-independent actuator 70. It may be understood that the sensors and controller 52 comprise a calibration means for maintaining the values of the steering position signals that correspond with the actual steering positions.

Rack 45 has a center position in which the steerable wheels of a vehicle are directed straight ahead relative to the vehicle. In an exemplary embodiment, rack-independent actuator 70 will provide a return torque that assists in returning the steering system to a center position.

In this system, the return torque is generated by electric motor 38, and a return torque component of the total desired torque signal is generated in controller 52 based upon the input received from sensors 122, 124, and 126. Thus, an accurate signal of the steering position is derived from absolute position sensor 124.

In order to express the full range of steering angles as the output of absolute position sensor changes, the apparatus utilizes an algorithm in controller 52. The algorithm may be embodied in a programmed digital computer or a custom digital processor (not shown).

Figure 15:
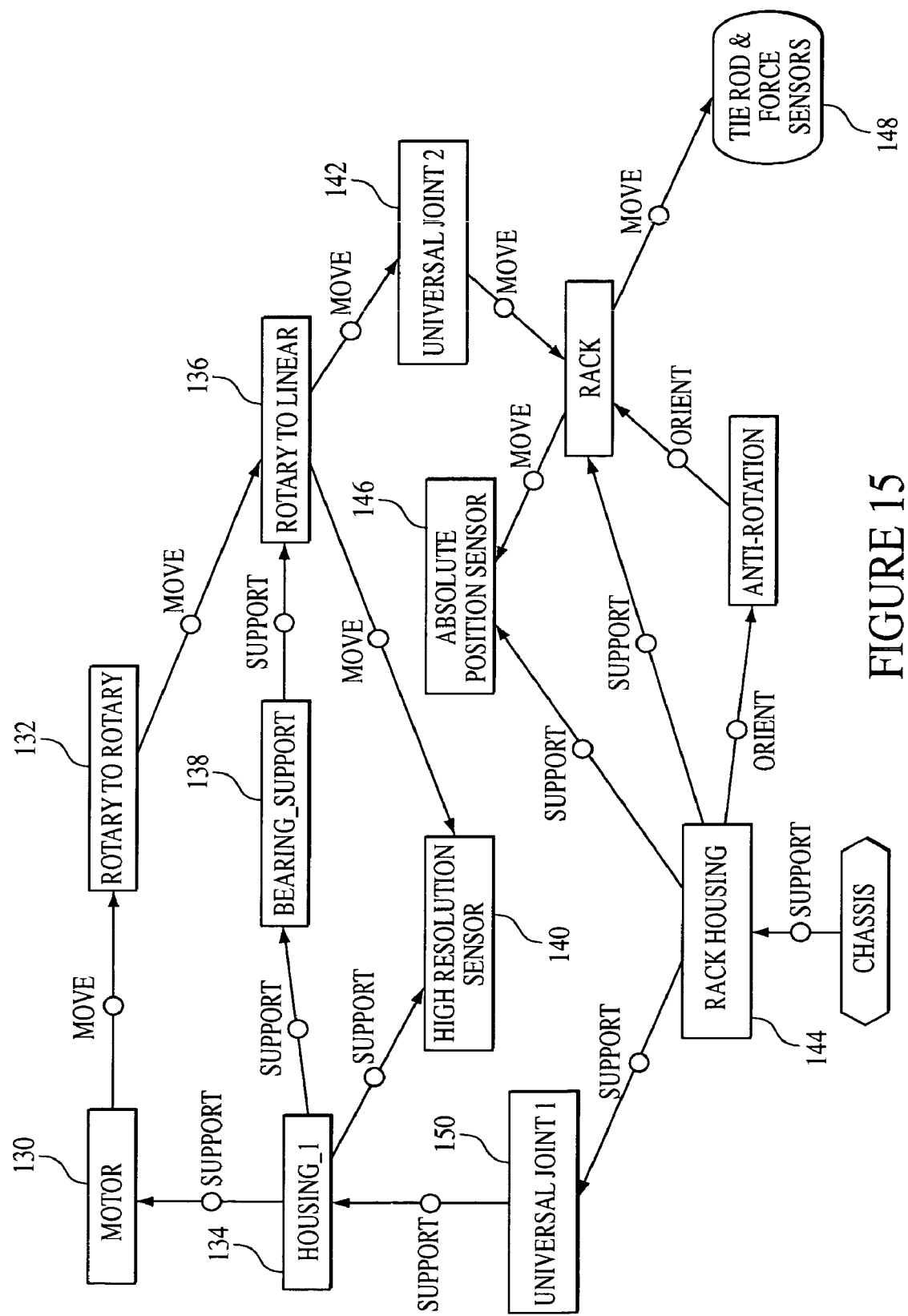
FIG. 15 is a block diagram of a rack-independent actuator system.

Referring now to FIG. 15, a block diagram illustrates the use of the universal joints and the unit interaction between various components of the rack-independent actuator system.

Block 130 represents the electric motor. Block 130 interfaces with block 132 that represents the rotary-to-rotary assembly of the rack-independent actuator system. Block 130 also interfaces with the housing of the ball-screw indicated at block 134. Block 132 interfaces with a block 136 that represents a rotary-to-linear assembly. Block 136 interfaces with a block 138 that represents the bearings of the ball-screw, and block 138 interfaces with the ball-screw housing. Block 140 represents a high-resolution sensor that interfaces with the housing (block 134) and the rotary to linear assembly (block 136).

Block 142 represents an interface between the rotary-to-linear assembly and the housing of the rack assembly.

Block 144 represents the housing of the rack assembly. Block 146 represents an absolute position sensor that interfaces with box 136 and box 144. Block 148 represents a tie rod and force sensor that interfaces with the housing of the rack assembly (block 144).

Block 150 represents the interface between housing 134 and the rack housing 144. It is here at block 150 in which universal joint 72 or stationary universal joint 72 is inserted to isolate the motor and belt and pulley assembly from the housing of the rack assembly.

Block 142 represents the interface between the rotary-to-linear assembly housing and the rack assembly. It is here at block 142 in which universal joint 74 or mobile universal joint 74 is inserted to isolate the movement of the rack assembly from the ball-screw nut of the ball-screw assembly.

This system accomplishes compensation through a series of sensors that provide feedback to several components. For instance, the rotary-to-linear assembly at block 136 receives inputs from the absolute position sensors at block 146. In this embodiment, the absolute position sensors are mounted to the ball-screw assembly. The absolute position sensor at block 146 provides steer angle signals that are sent to the controller.

While exemplary embodiments have been described with reference to a steering system for a vehicle, the rotary-to-linear mechanism is not intended to be limited to such applications. It is contemplated that in accordance with the exemplary embodiments, a rotary-to-linear conversion mechanism utilizing a pair of universal joints for isolating the mechanism from misalignment and/or uneven loading can be applied to any application.

In related embodiments, this system is related to the power assist section, with the output being a linear motion, of any kind of steering application. The power assist mechanism may be powered via a rotary type electric motor with potentially additional speed reducers, such as belt and pulley, gearbox, harmonic drive, etc., for torque multiplication, and the linear output is achieved by moving a shaft or linear section, such as a rack, along its axis. Between the power section and the linear output there may be a rotary-to-linear actuator (such as ballscrew, screw, ACME screw, rolling ring, etc.). It should be understood that other types of appropriate speed reducers, shafts, and rotary-to-linear actuators not specifically described herein are also within the scope of this system.

Figure 18:
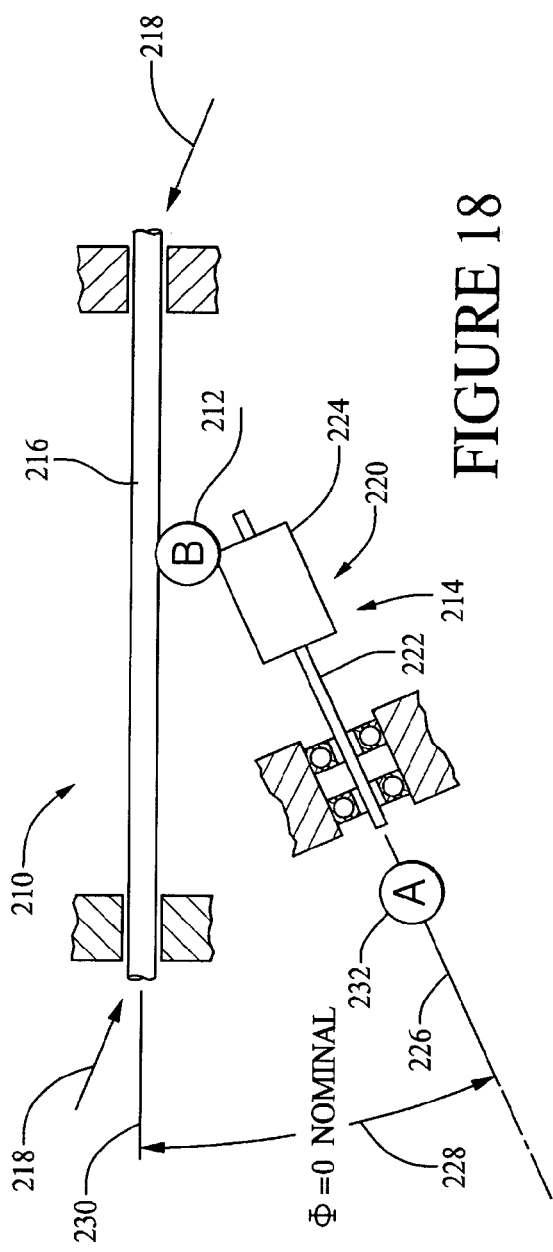
FIG. 18 is a diagrammatic front view of an interface location between a rotary to linear actuator and a linear section of an actuator.

As shown in FIG. 18, a mechanism 210 may include an interface B 212 that may connect the power section plus rotary-to-linear actuator 214 to the linear section (e.g., rack) 216 such that the individual subcomponents constraints are all met. Thus, in a design phase of the mechanism 210, optimization of the mechanism 210 (in efficiency, size and durability) may be possible in the subcomponent level using the technology. This may save time and have cost reductions in a manufacturing process, as the technology risk is minimized. For simplicity, the interface 212 may be provided between the rotary-to-linear actuator 214 and the linear section (e.g. rack) 216, as shown in FIG. 18.

It should be noted that while a rack is specifically described with respect to this system, the mechanisms and systems described herein may be incorporated into any rack based or drag link based system wherein the ground may be the chassis, components that do not move, a suspension system, or any other suitable components.

A characteristic of the interface B 212 described above may be to eliminate side loads (perpendicular to the axial direction of the linear movement) and moments, which may be produced by geometric or dynamic means through external forces 218. Such conditions, if not avoided, may lead to undesirable friction increase.

In one embodiment of the mechanism 210, a ballscrew 220 may be used as the rotary-to-linear actuator 214 and the linear section 216 may be a rack. In this example, the ballscrew-screw 222 may rotate about the axis 226 and the ballscrew-nut 224 may translate along the axis 226, as shown in FIG. 18. The nominal angle 228 between the two axes 226 and 230 is selected to be zero degrees, which would lead to the ball screw 222 and the rack 216 being parallel. In actual applications, however, perfectly parallel axes may be difficult to maintain, and therefore the axes 226, 230 become skewed, as shown in an exaggerated skew, in FIG. 18. In actuality, the skew is preferably not more than one or so degrees. Furthermore, in other embodiments, deviation from perfect conditions are still within the scope of the embodiments. Special cases of the general form of the actuator shown in FIG. 18 may be created such as if the two mentioned axes 226, 230 are parallel, the two mentioned axes 226, 230 are collinear, or if side load effects (such as deflection of rack etc.) are negligible, or if the load could be acting in only one side of the rack 216, or in various combinations of the above situations. It should also be noted that the load may also act on the ballscrew-nut 224 or the ball screw-screw 222.

In determining a properly constrained system (mechanism), the boundary conditions may be set as follows: the ballscrew-screw 222 may turn about the axis 226 (the A interface 232) but may not displace (thus, a revolute joint); the rack 216 may travel along the axis 230 and may rotate about the axis 230 (thus, a cylindrical joint, even though there are two cylindrical joints between the raok 216 and ground, it may be counted as one); and, the ballscrew-nut 224 may travel a lead length along the axis 226 as long as when the ballscrew-screw 222 makes one revolution the nut 224 does not rotate (with respect to axis 226). It should be understood that the basic kinematics of constrained rigid bodies includes many different types of pairs in spatial mechanisms, including spherical pairs, plane pairs, cylindrical airs, revolute pairs, prismatic pairs, and screw pairs, where each pair may define a joint within a mechanical system. A cylindrical pair, or joint, keeps two axes of two rigid bodies aligned, where the bodies will have an independent translational motion along the axis and a relative rotary motion around the axis. Therefore, a cylindrical pair removes four degrees of freedom from spatial mechanism, and the DOF=2. A revolute pair, or joint, keeps the axes of two rigid bodies together, where the bodies have an independent rotary motion around their common axis. Therefore, a revolute pair removes five degrees of freedom in spatial mechanism, and the DOF=1.

Interface B 212, shown in FIG. 18 between the ballscrew-nut 224 and the rack 216, may be used to constrain the ballscrew-nut 224 properly (as described in the third boundary condition described above). There are issues that need to be considered before an appropriate linkage is designed. It should be understood that an ideal joint has nothing but the number of degrees of freedom that it should have, however, unless the joint is preloaded, a joint is always non-ideal since lash will add more degrees of freedom. First, the tolerance of parts may force for non-ideal joints and linkages, and, second, the loads may result in component deformation. As a result of these conditions, it may be assumed that the components are imperfect and that there will be positional errors at any given instant but the imperfections are expected to be small relative to the displacements and size of the components. Thus, for all practical purposes the two axes 226, 230 may be assumed to be slightly skew from this point on and that the side loads on the rack 216 exist. Then, there may be a series of mechanisms that may be correct based on kinematics (degree of freedom allows for one input) as well as dynamics. For a properly constrained system, the interface B 212 may have three rotational degrees of freedom, while the system as a whole has one degree of freedom. In prior art systems, to compensate for the irregularities between the axes 226, 230, the quick fix has usually been to provide rubber within a connection that under-constrains the system by providing too many degrees of freedom. Thus, the prior art mechanisms and systems are usually under-constrained, that is, are provided with too many degrees of freedom and therefore not consistent in dynamic performance.

Figure 19:
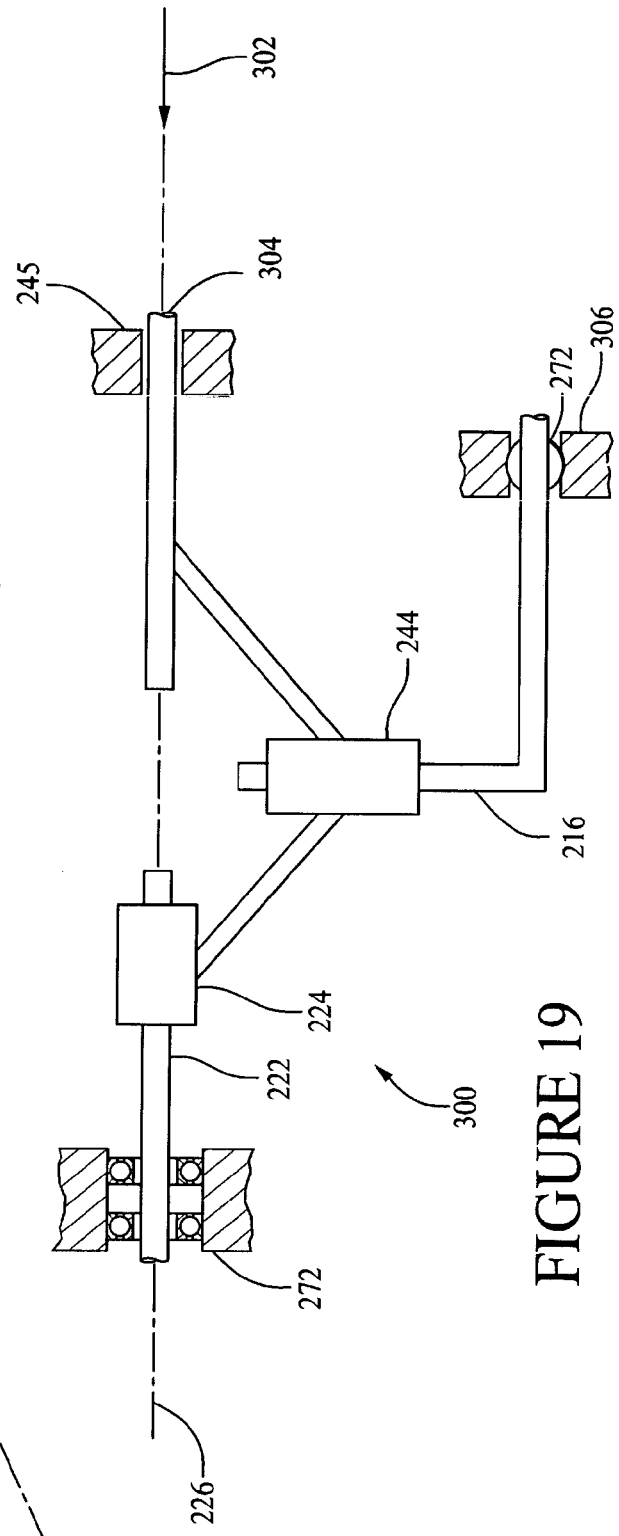
FIG. 19 is a diagrammatic front view of a collinear load acting on a ballscrew-screw.

Turning now to FIG. 19, the ballscrew nut 224 is shown being loaded, through load 302, collinear to the ballscrew axis 226 at one side 304, which is a special case mechanism 300. However, even if load 302 is not perfectly collinear, the mechanism may still be within the scope of these embodiments. Thus, it may be possible to deviate the load 302 from the axis 226 a couple or so degrees. Combination joint 306 represents a revolute joint 272 at the rack cylindrical joint 244, which is possible via deflecting the joint. A calculation of the degrees of freedom "d.o.f." is shown to equal one for the whole system, and therefore mechanism 300 is properly constrained. The d.o.f. may be calculated using the following equation:

$$d.o.f.=\lambda(L-J-1)+\Sigma f_i, \text{ wherein } \lambda \text{ is the degree of the space,}$$

wherein 6 degrees in the space means the system is operating in 3-dimensional space, L is the number of links in the system, J is number of joints in the system, and $f_i$ is the degree of freedom for each individual joint (for example, $f_i=1$ for revolute and slider joints, $f_i=2$ for cylindrical joints, $f_i=3$ for balljoints, etc.

For the FIG. 19 embodiment, the d.o.f. calculation is as follows:

$$d.o.f.=\lambda(L-J-1)+\Sigma f_i=1$$

$$\lambda=6$$

$$L=5$$

$$J=5$$

$$\Sigma f_i=2 \text{ revolute}+2 \text{ cylindrical}+1 \text{ ball screw}=2(1)+2(2)+(1)=7$$

For a d.o.f. calculation for the mechanism 300 of FIG. 19, it is noted that the $5^{th}$ link is the $5^{th}$ joint. That is, the fifth link in the actuator is the bushing that forms the cylindrical joint 244. Thus, FIG. 19 shows the collinear representation of the ballscrew 222 and nut 224 and the force. The load previously acting at the end of the rack 216 (as in FIG. 18) is now a load 302 acting on the ballscrew nut 224. The cylindrical joint 245 at the end of the ballscrew nut 224 is for dynamic loading concerns and kinematically not required, therefore that particular cylindrical joint 245 need not be included in the d.o.f. calculations. The cylindrical joint 245 at the end of the ballscrew nut 224 is a redundant cylindrical joint 245 which should be collinear to the ballscrew axis 226.

Figure 22:
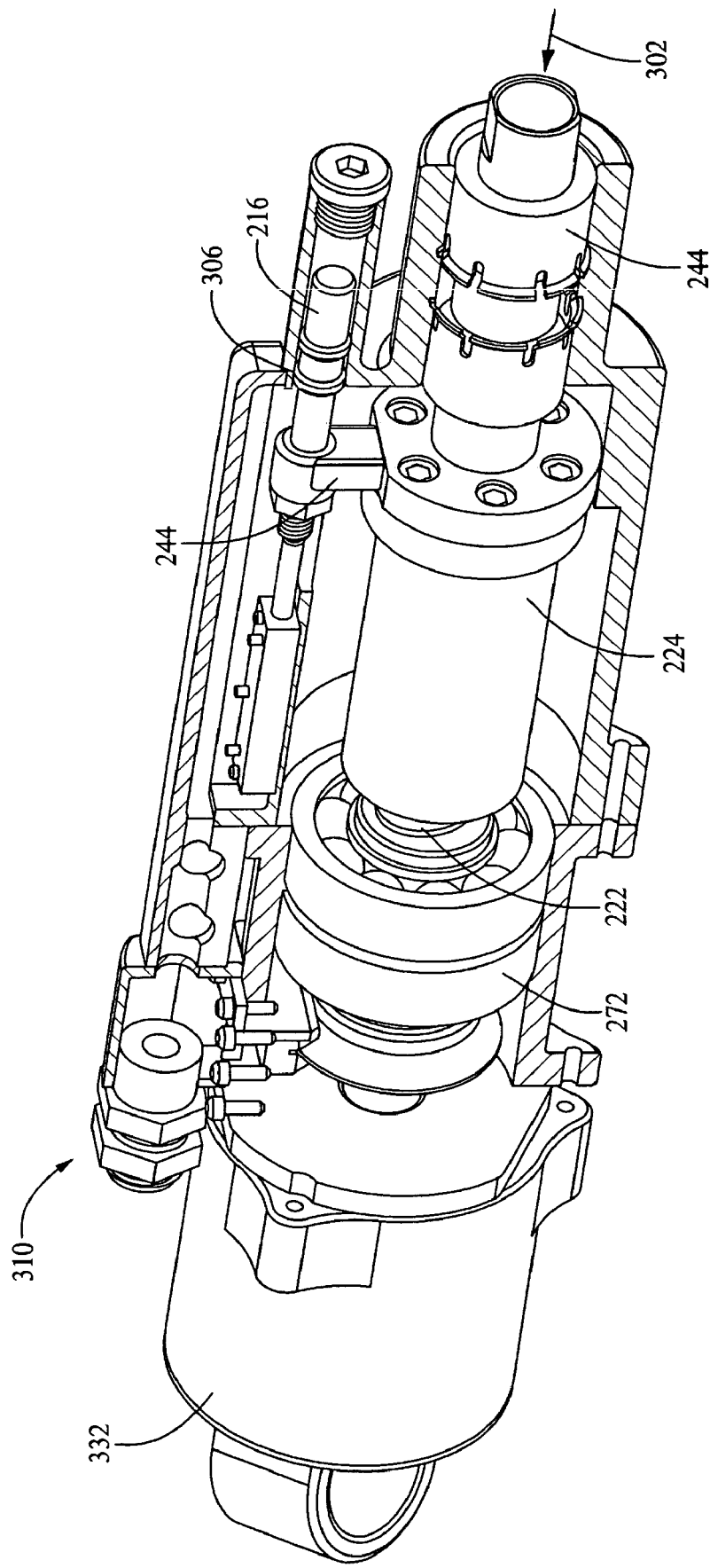
FIG. 22 is a perspective view of the special case actuator of FIG. 19.
Figure 23:
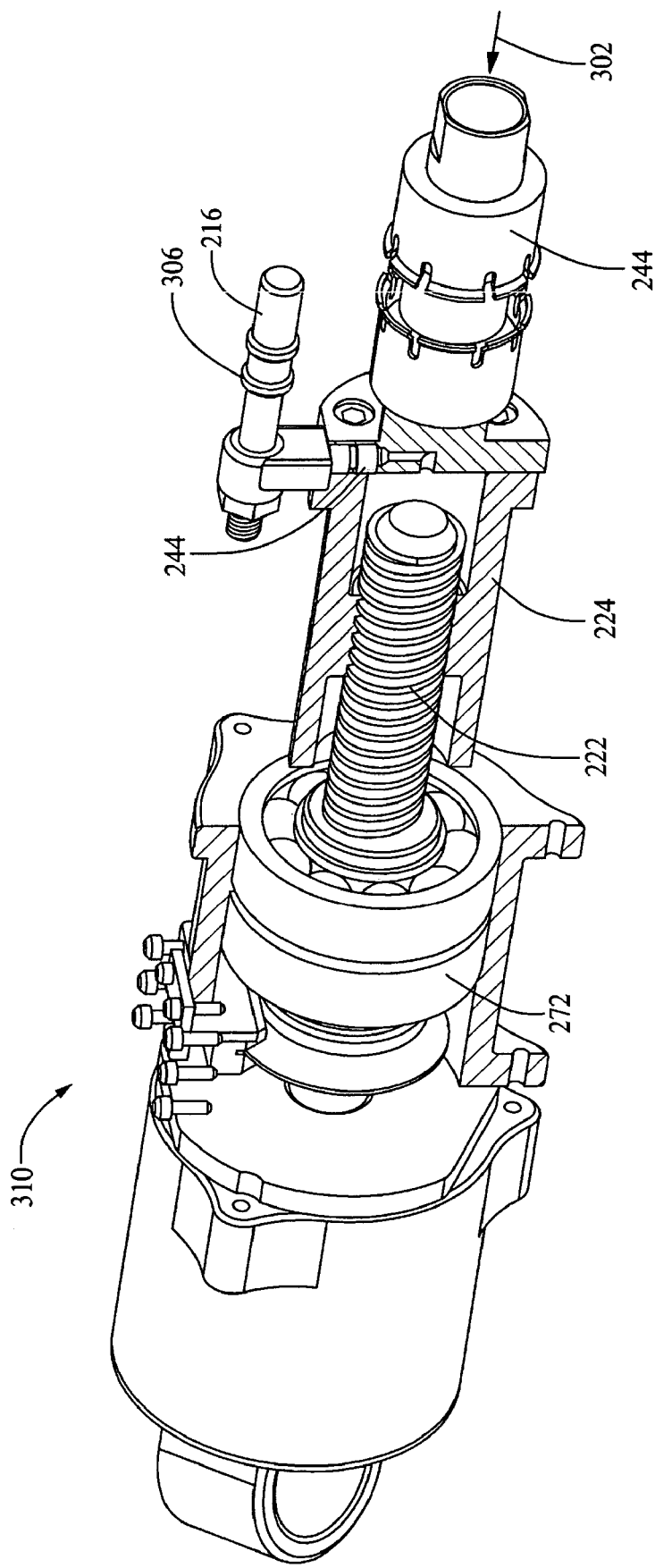
FIG. 23 is a perspective view of the interface of FIG. 19 with respect to a ball screw nut and a rack.
Figure 24:
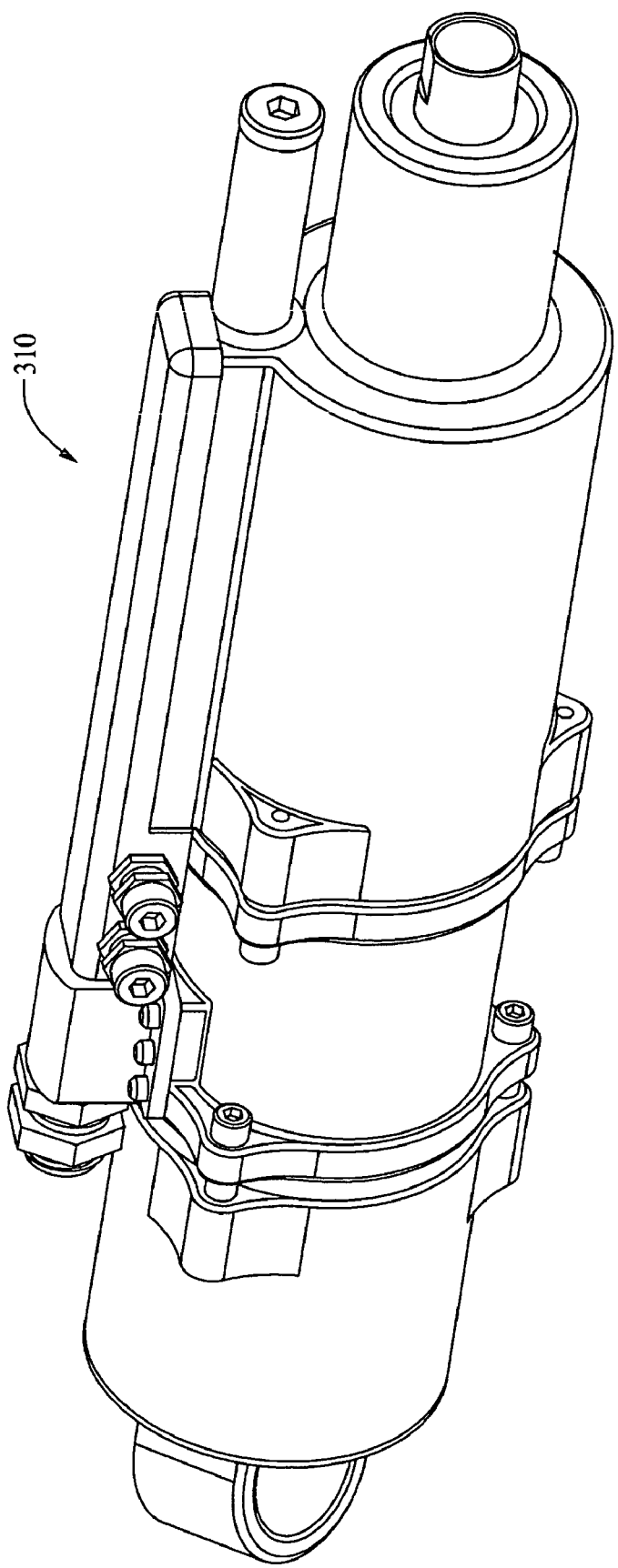
FIG. 24 is a perspective view of an overall appearance of a special case actuator shown in FIG. 22.

FIG. 20 shows a cross-sectional view of an implementation of the mechanism 300 in an actuator 310. The "ground" or housing 312 is shown about the mechanism 300. FIG. 21 shows an additional cross-sectional view similar to FIG. 20, and revealing the ballscrew screw 222 within the revolute joint 272. FIGS. 22-24 show additional interior and exterior views of the mechanism 300 as housed within the special case actuator.

FIG. 25 shows another embodiment of an interface between a movable linear section (e.g. rack 216) and a rotary to linear actuator (e.g., ballscrew screw 222 and ballscrew nut 424). This embodiment employs a mechanism 420 that includes a "block on a plane" joint. A block on a plane joint has three degrees of freedom. A block may not separate from the plane to be considered a true block on a plane joint, and therefore it may not "rock" relative to the plane. It may, however, slide relative to the plane and spin. The block on a plane joint is used in this mechanism 420 by employing a ball nut 424 that has an angled face 440 for sliding relative to a plane 436 that is connected to the rack 216 such as through connector 442. Plane 436 thus moves with the rack 216. Side loads 426 and 428 are shown acting on rack 216, which come from external forces such as from a wheel, suspension system, etc. The angle $\phi$ is similar to the angle 228 in FIG. 18, and represents an angle between the ballscrew screw axis 226 and the rack axis 230.

The angle between the ballscrew screw axis 226 and the plane 436, angle β 430, will determine side load to the ballscrew screw 222. The block on a plane joint as used in this embodiment can center forces between the ballscrew screw 222 and the ballscrew nut 424 about a center of the ballscrew nut 424, without the need for fine adjustments. That is, as will be further explained below, the rack 216 and the ballscrew nut 424 are constrained from rotation about their axes, however, due to inevitable imperfections there may be slight rotation of these elements. The slight rotation actually serves to self-correct the interface by centering the forces between the ballscrew screw 222 and the ballscrew nut 424 about a center of the ballscrew nut 424. This self-correcting action eliminates the need for tedious, time-consuming fine adjustments between the elements during assembly.

If the angle β 430 between the ballscrew screw axis 226 and the plane 436 is 90 degrees, then a separate anti-rotation for the ballscrew nut 424, to prevent the ballscrew nut 424 from rotating, would be needed. Although the side load to the ballscrew screw 222 would be removed, the ballscrew nut 424 would require an anti-rotation device. As can well be imagined, it β 430 was 90 degrees, then the ballscrew nut 424 would rotate relative to the plane 436, and therefore the rack 216 would not move with the ballscrew nut 424. Thus, such an angle for β 430 is not desirable. If the angle β 430 is 0 degrees, then the plane 436 would be parallel to the ballscrew screw axis 226, and the rack 216 will again not move when the ballscrew nut 424 moves. The larger the deviation of the angle β 430 from 90 degrees, the larger the side load will be on the ballscrew mechanism. It has been found that arranging the ballscrew screw 222 to have an angle β 430 less than 90 degrees, but greater than 81 degrees, works well with the mechanism 420. Manufacturers often specify that the sideloads to the ballscrew mechanism be less than 10% of the axial load it carries. Thus, since 10% of 90 degrees is 9 degrees, an appropriate angle for β 430 would be 81<β<90. The closer to 90 degrees β 430 is, the closer the ballscrew nut 424 is to rotating, and the further from 90 degrees β 430 is, the greater the side load is on the ballscrew mechanism. Thus, a compromise between possible rotation of the ballscrew nut 424 and side loads to the ballscrew mechanism may be reached by selecting an angle of β 430 between 81 and 90 degrees. It should be understood that although 81 degrees is specified, in some instances, if greater side loads than 10% of an axial load that a ballscrew mechanism carries are acceptable, then β 430 may be less than 81 degrees.

For the FIG. 25 embodiment, the actuator or mechanism 420 as a whole has only one degree of freedom, where the d.o.f. calculation is as follows:

$$d.o.f. = \lambda(L-J-1) + \Sigma f_i = 1$$

$$\lambda = 6$$

$$L = 4$$

$$J = 4$$

$\Sigma f_i = 1$ revolute joint+1 cylindrical joint+1 ballscrew screw+1 block on plane=1(1)+1(2)+1(1)+1(3)=7

FIG. 26 shows an exterior view of the actuator housing for the mechanism 420 described herein for providing a properly constrained interface. The tie rods 422, motor 332, and the housing (ground) 312 are shown.

Figure 27:
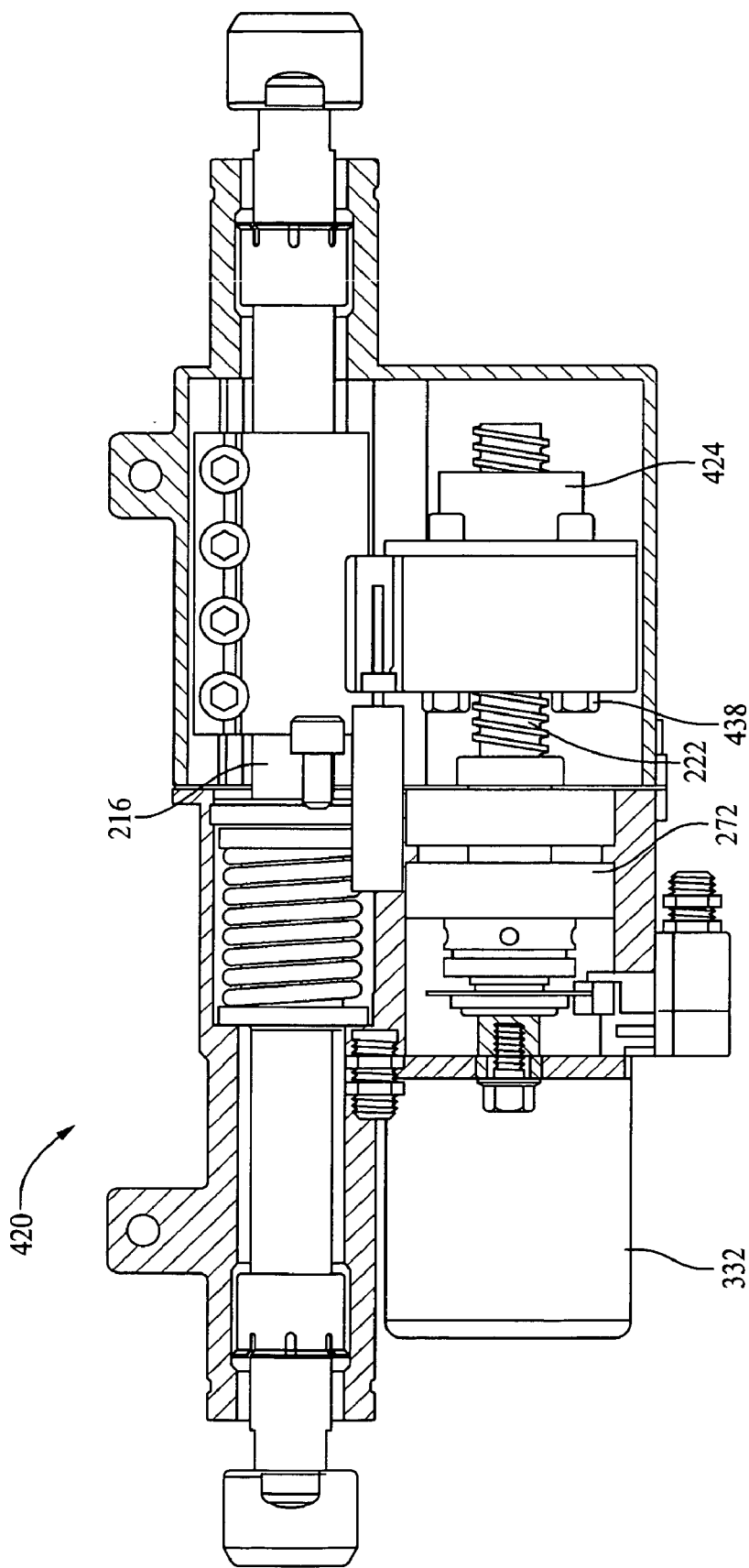
FIG. 27-29 are cross-sectional views of the actuator of FIG. 26.
Figure 28:
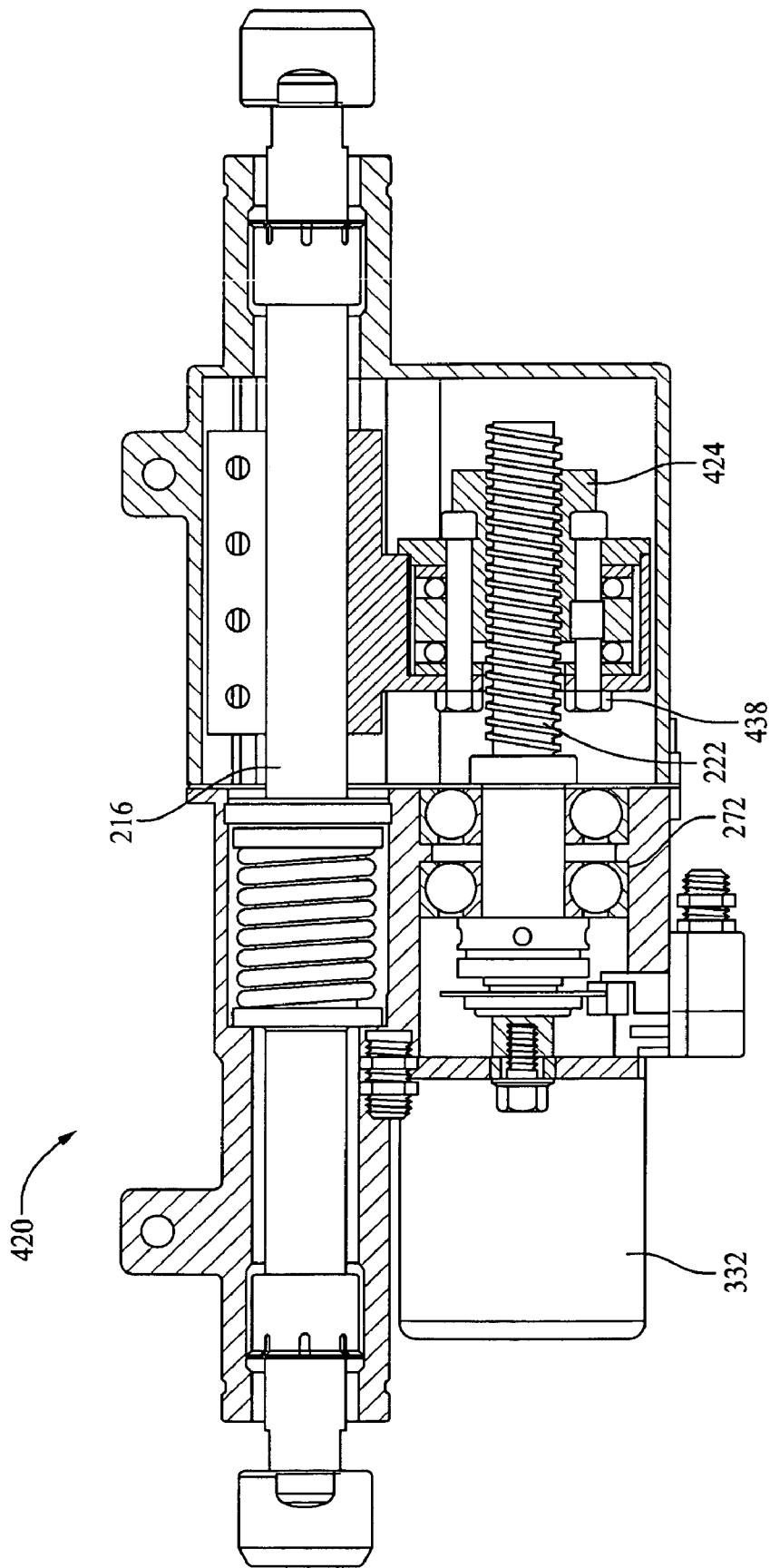
Figure 29:
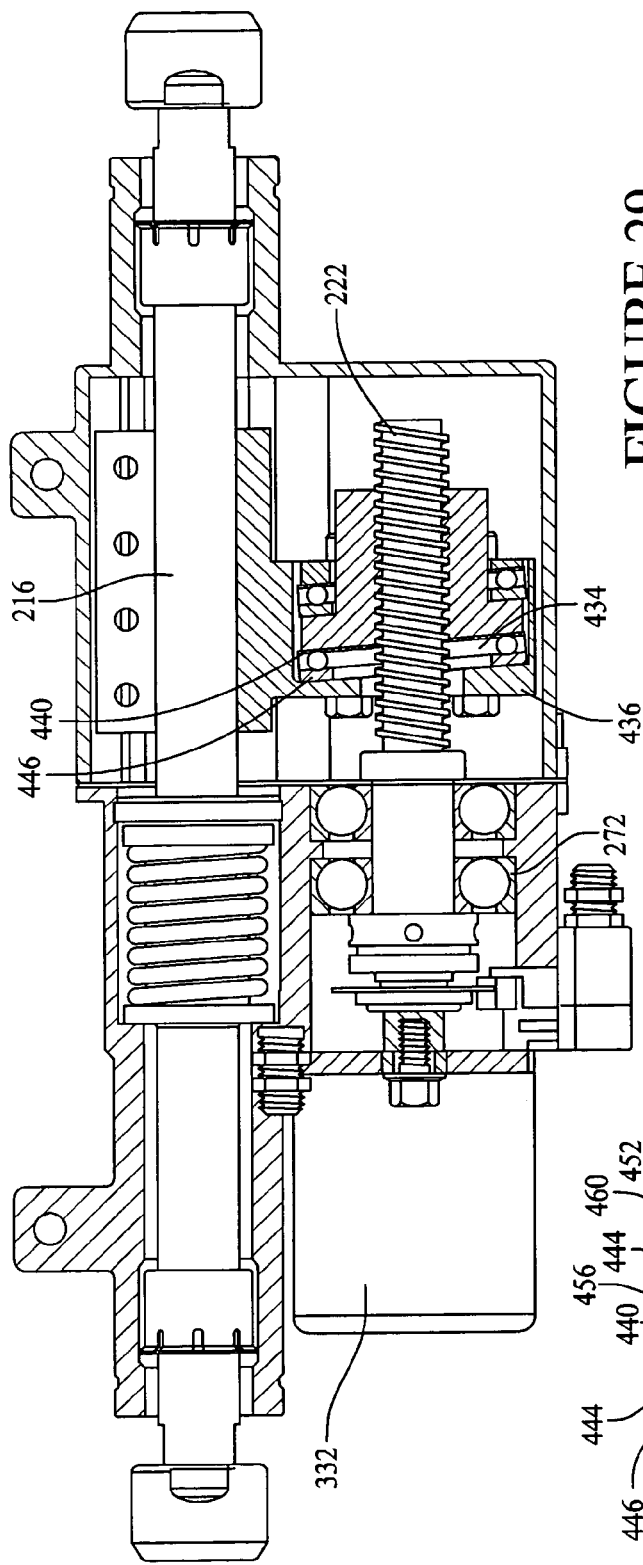
Figure 30:
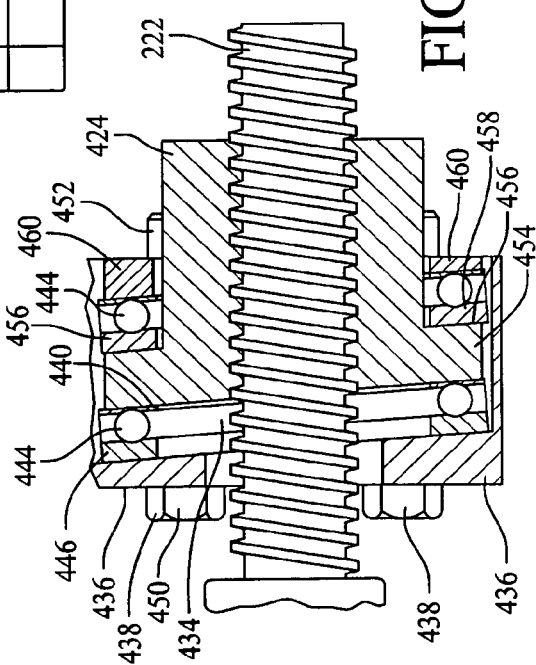
FIG. 30 is an enlarged detail showing a ballscrew nut and a plane.

FIG. 27 shows a partial cross-sectional view of the mechanism 420, revealing the rack 216, the ballscrew screw 222, an the ballscrew nut 424 and bolts 438 which may be employed to hold the plane 436 relative to the ballscrew nut 424. FIG. 28 is another partial cross-sectional view of the mechanism 420, similar to FIG. 27, but additionally exposing a cross-section of the revolute joint 272, and displaying the rack 216 and ballscrew screw 222 within the ballscrew nut 424. FIG. 29 is another partial cross-sectional view of the mechanism 420, similar to FIGS. 27 and 28, but additionally showing the plane 436 that the ballscrew nut 424 may abut against, and the angled face 440 of the ballscrew nut 424. FIG. 30 shows an enlarged view of the relevant area where the angled face 440 of the ballscrew nut 424 engages the plane 436.

It should be understood that there are alternative constructions of a block on a plane, using a ballscrew nut 424 as the block, not disclosed herein that would also be within the scope of the mechanism 420. For exemplary purposes only, the ballscrew nut 424 is shown as abutting spacer element 434 which may include bearings (balls) 444 and the plane 436 may include bearing surfaces 446 for engaging with the bearings 444. The bearing surfaces 446 may comprise a washer that is placed against the plane 436 for providing a hardened surface upon which the bearings 444 can ride. It should be understood that the face 440 of the ballscrew nut 424 may additionally include a bearing surface such as a washer for providing a hardened surface upon which the bearings 444 can ride The spacer element 434 may be a physical element that holds the bearings 444 such as for proper spacing during assembly, or may simply be a space between the face 440 (or bearing surface/washer on face 440) and the bearing surfaces 446. Also by example only, the plane 436 may be embodied within an angled plate-like extension that extends from a connector 442 that connects the angled plate-like extension, plane 436, to the rack 216, as clearly shown in FIG. 31. The plane 436 may be rigidly connected to the rack 216 such that the longitudinal motion of the rack 216 along its longitudinal axis 230 is translated to motion of the plane 436, in an equivalent direction. Except due to imperfections, the rack 216 and the ballscrew nut 424 do not rotate about their axes. The plane 436 may be held in place relative to the rack 216 using bolts 438, which are further employed to maintain the ball nut 424 in place relative to the plane 436. It should be understood that, in a block on a plane joint, the block may not depart from the plane, and thus is may not rock relative to the plane. Thus, in the mechanism 420, the ballscrew nut 424 is clamped to the plane 436 using bolts 438, and held thereto with nuts 450, where the nuts 450 are threaded onto the shafts of the bolts 438. The bolt heads 452 connect with the shafts of the bolts 438 and provide a means for tightening the bolts 438 and nuts 450. The shafts of the bolts 438 may travel through a flange 454 of the ballscrew nut 424 so as not to interfere with the ballscrew nut 424/ballscrew screw 222 operation. One side of the flange 454 has been described as angled face 440. The other side of flange 454 is face 456 which may be provided with a bearing surface, such as a washer, 458, for engaging with bearings 444 that abut a second plane 460. The second plane 460 may have an angled face that is parallel with the angled faces of the first plane 436 and angled face 440. The planes 436 and 460 may be apertured, that is, have an opening, to allow passage of the ballscrew screw 222 therethrough. The opening of the plane 460 may be larger than the opening of the plane 436, since the opening of the plane 460 may also be large enough to allow the passage of the ballscrew nut 424 therethrough. Thus, it should be understood that the ballscrew nut 424 is effectively "sandwiched" in between two plates (planes 436 and 460) via bearings 444 and bearing surfaces. This sandwiching ensures that movement of the ballscrew nut 424 will translate to movement of the rack 216, and movement of the rack 216 will translate to movement of the ballscrew nut 424. That is, there is a lash free motion between the ballscrew nut 424 and the rack 216. When the motor 332 operates to rotate the ballscrew screw 222, the rotation of the ballscrew screw 222 translates into longitudinal movement of the ballscrew nut 424. Depending on the direction of rotation of the ballscrew screw 222, the ballscrew nut 424 will either push against the plane 436 or the plane 460. Because the ballscrew nut 424 and planes 436, 469 are all clamped together, movement against either plane will cause a corresponding movement to the rack 216 via the connector 442.

Figure 31:
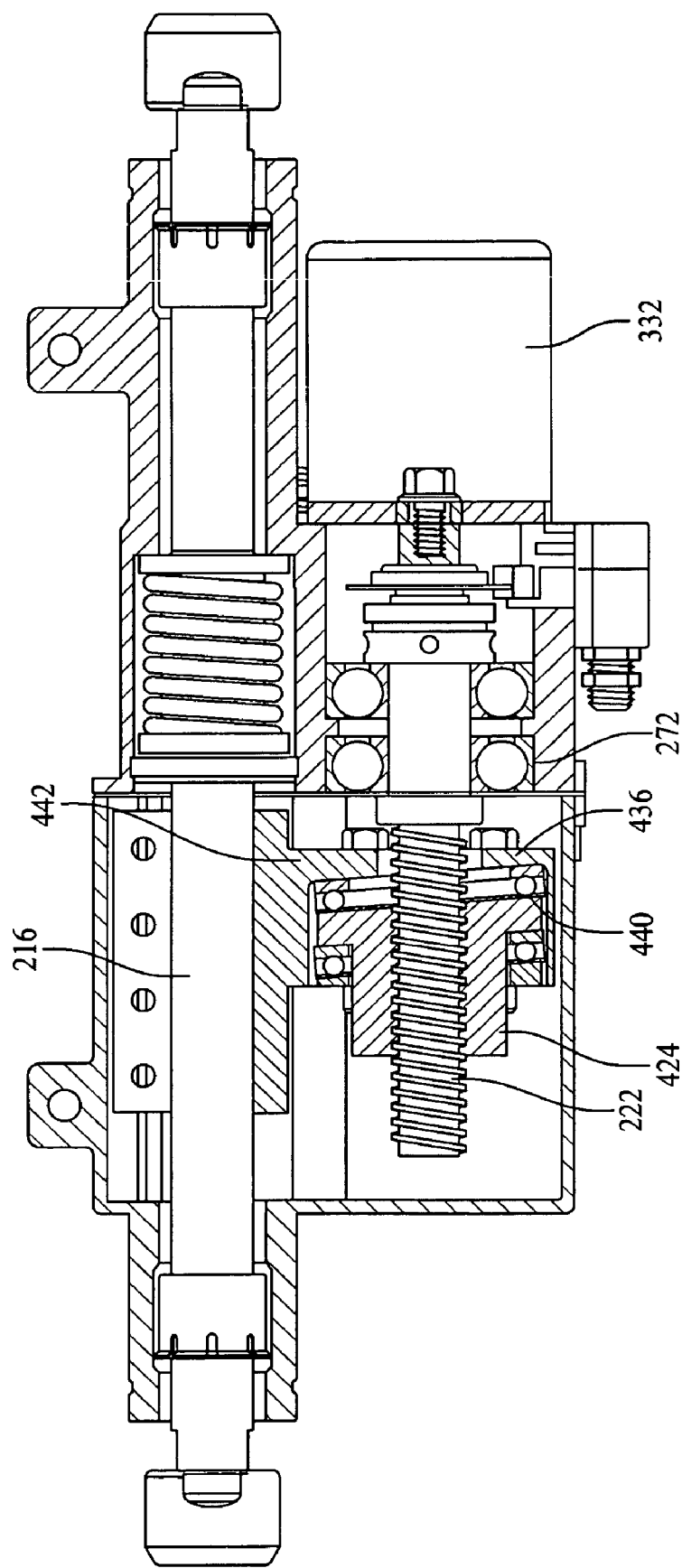
FIG. 31 is a cross-sectional view of an alternate embodiment of the actuator of FIG. 26.
Figure 32:
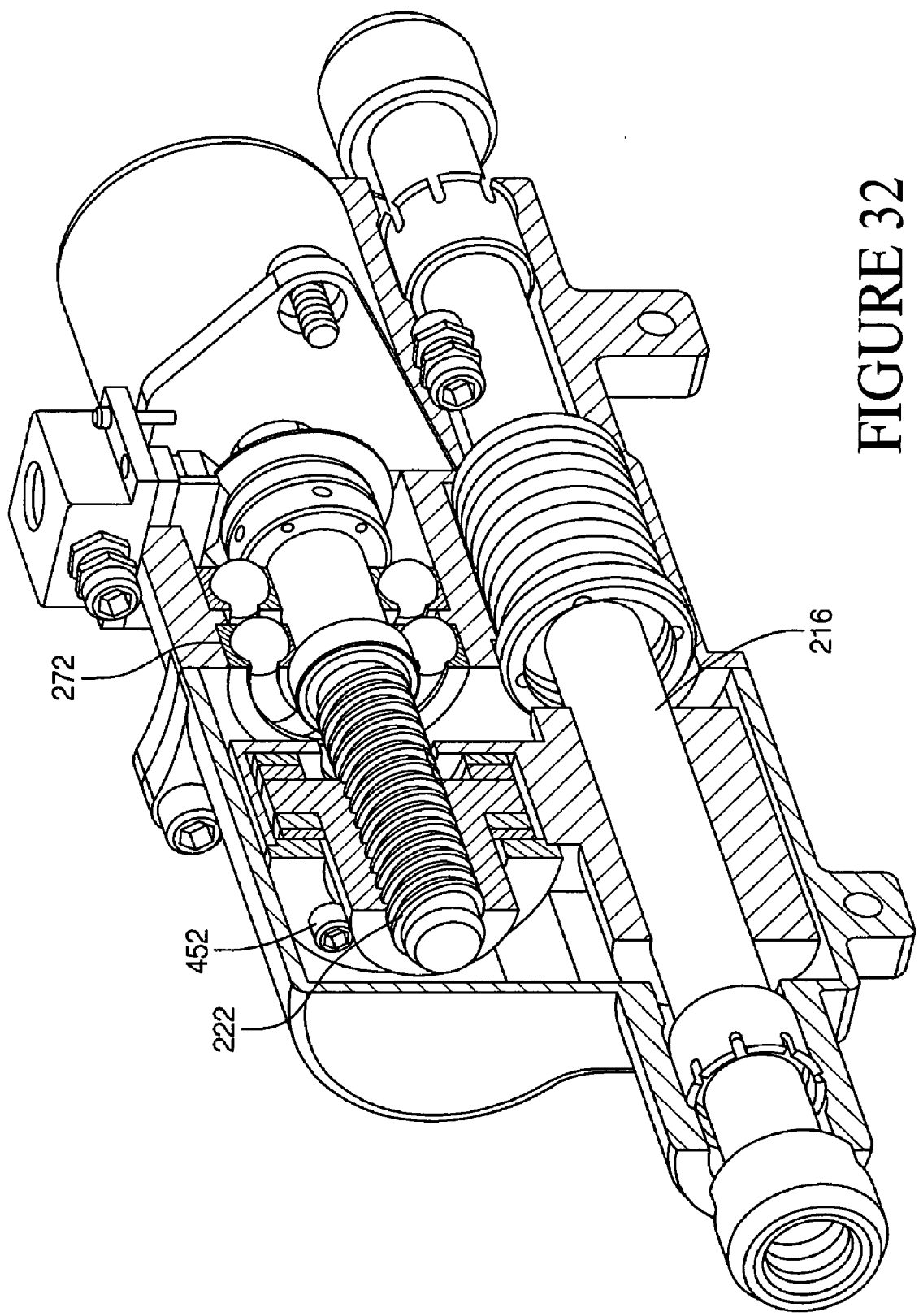
FIG. 32 is a cross-sectional view of the actuator of FIG. 26.

As shown in FIG. 31, it should further be understood that a similar "reversed" angle may be accomplished by angling the plane 436 away from the ball nut as it extends away from the rack 216, and having the face 440 angled to complement the plane 436. The elements utilized in such an embodiment would otherwise be the same. FIG. 32 shows another cross-sectional view of a potential configuration for the mechanism 420.

The previously described mechanisms and configurations may be achieved through deflecting components or joints appropriately along the particular direction or twisting about an appropriate axis. The next generation mechanization may eliminate the joints at interface B 212 in FIG. 18 and fill the interface B 212 with a flexible component that is attached in a fixed manner to both the rack 216 and to the ballscrew-nut 224. Thus, for such a mechanism, gaps between components (or joints as there are none), thus noise and vibration, the nonlinearity (in controls) and number of components (reliability and assembly) may be reduced.

Figure 33:
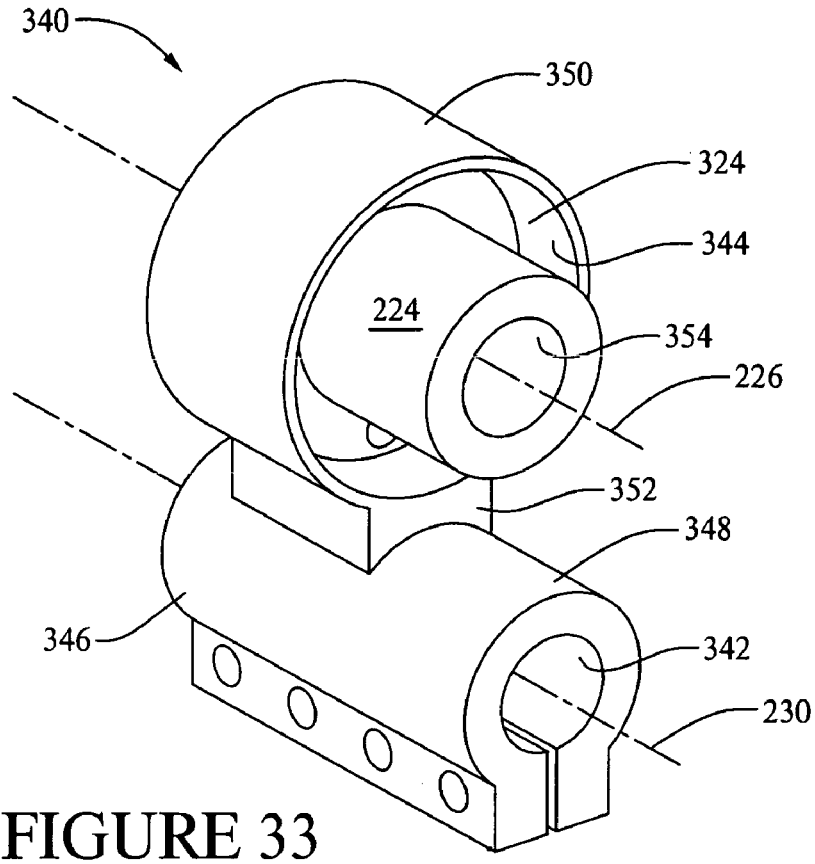
FIG. 33 is a perspective view of an interface between a rotary to linear actuator and a linear section.
Figure 34:
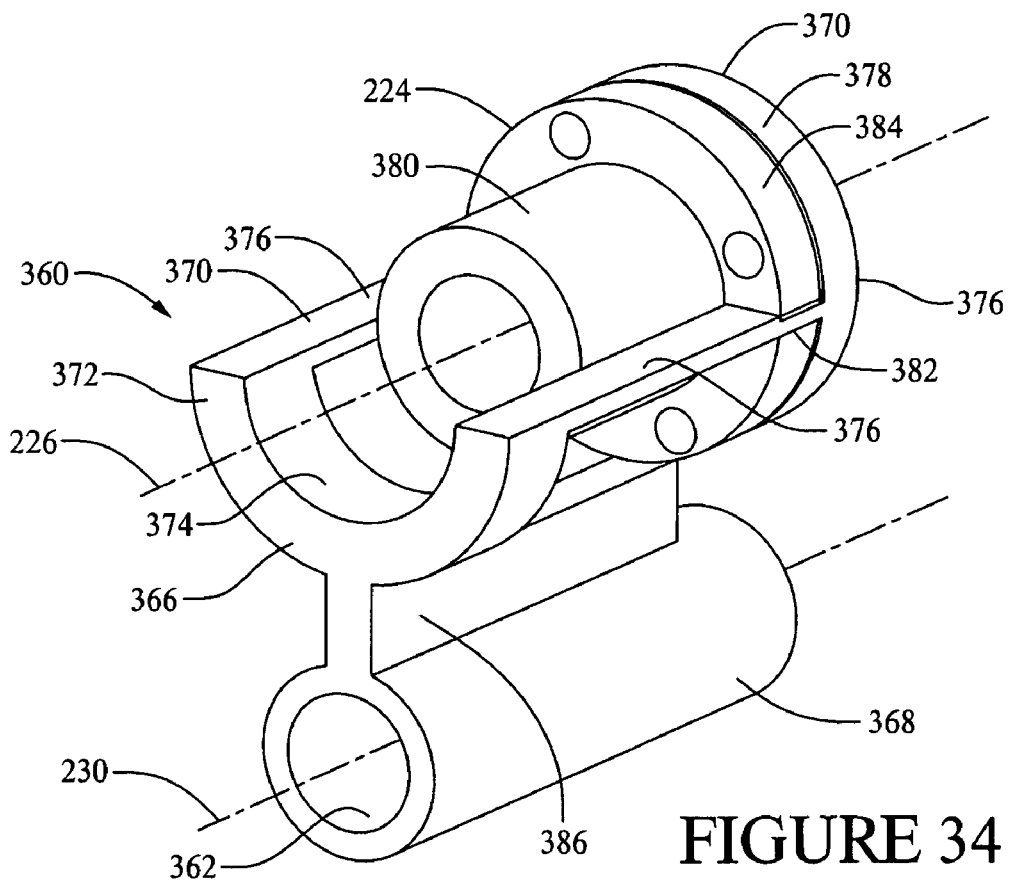
FIG. 34 is a perspective view of an alternate interface between a rotary to linear actuator and a linear section; and, FIG. 35 is a perspective view of another alternate interface between a rotary to linear actuator and a linear section.
Figure 35:
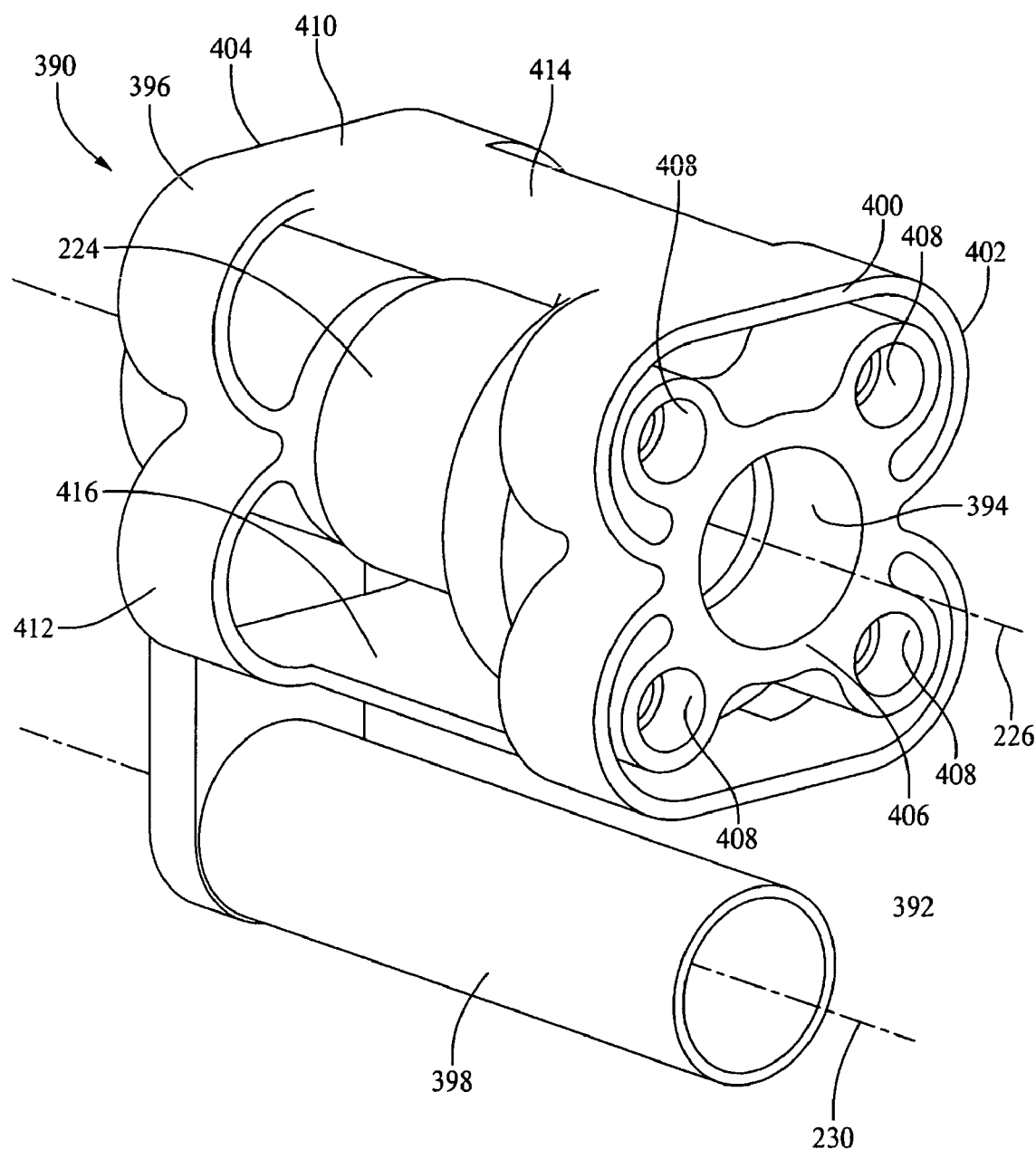

Turning to FIGS. 33-35, examples of mechanisms that use a flexible component may provide a compliant member adjacent the ballscrew nut as shown. That is, interface B 212 shown in FIG. 18 is replaced by a flexible member, such as rubber or deflectable strips. To prevent under constrainment, a coupler as will be described may be used.

Enough degrees of freedom are achieved with the following mechanisms for approximately matching kinematics. Turning now to FIG. 33, one exemplary coupler 340 is shown which is suitable for use as the coupler 334 within an actuator as previously described. The coupler 340 houses the compliant member 324 at interface B 212 in FIG. 18. The coupler 340 may include a first longitudinal opening 342 corresponding to the rack axis 230 and a second longitudinal opening 344 corresponding to the ballscrew axis 226. Although the coupler 340 may have one unitary body 346, the body 346 may include a first body portion 348 for surrounding the rack 216 and a second body portion 350 for surrounding the ballscrew nut 224. The unitary body 346 may be formed from a single, unjointed piece of material. A connecting portion 352 may be provided between the first body portion 348 and the second body portion 350 for appropriately spacing the coupler 340 about the rack 216 and the ballscrew nut 224. The second body portion 350 may further include a compliant member 324 positioned within the second longitudinal opening 344.

Turning now to FIG. 34, another exemplary coupler 360 is shown. The coupler 360 may include a first longitudinal opening 362 corresponding to the rack axis 230 and a second longitudinal opening (hidden from view) corresponding to the ballscrew axis 226. Although the coupler 360 may have one unitary body 366, the body 366 may include a first body portion 368 for surrounding the rack 216 and a second body portion 370 for surrounding the ballscrew nut 224. The unitary body 366 may be formed from a single, unjointed piece of material. The second body portion 370 may include a first end 372 having a U-shaped member 374, and a second end 376 having a ring shaped member 378. The ring shaped member 378 and the U-shaped member 374 may be connected by strips 376 which extend parallel to the longitudinal axis 226. The ballscrew nut 224 may include a cylindrical shaped portion 380 nestled between the strips 376 and a ring shaped portion 384 abutting the ring shaped member 378. The strips 376 may pass through slots 382 in the ring shaped portion 384 of the ballscrew nut 224. The first body portion 368 and the second body portion 370 may be connected by a connecting portion 386. In the coupler 360, compliance may be achieved through deflecting material of the strips 376. The compliance is met in three (up-down, side to side, and twisting) directions while maintaining axial rigidity. Thus, this embodiment achieves compliance without using rubber and without using a jointed interface for the interface B 212.

Turning now to FIG. 35, another exemplary coupler 390 is shown. The coupler 390 may include a first longitudinal opening 392 corresponding to the rack axis 230 and a second longitudinal opening 394 corresponding to the ballscrew axis 226. Although the coupler 390 may have one unitary body 396, the body 396 may include a first body portion 398 for surrounding the rack 216 and a second body portion 400 for surrounding the ballscrew nut 224. The unitary body 396 may be formed from a single, unjointed piece of material. The second body portion 400 may include a first end 402 and a second end 404. Each end may include a main circular portion 406 with four smaller circular portions 408 evenly spaced about the outer periphery of the main circular portion 406. Also for each end, a first C shaped portion 410 may surround an upper pair of circular portions 408 and a second C shaped portion 412 may surround a lower pair of circular portions 408. A first connecting strip 414 may connect the first C shaped portion 410 on the first end 402 to the first C shaped portion 410 on the second end 404. A second connecting strip 416 may connect the second C shaped portion 412 on the first end 402 to the second C shaped portion 412 on the second end 404. The ballscrew nut 224 may be positioned between the main circular portions 406 and within the first and second connecting strips 414, 416. Compliance in the coupler 390 may be achieved through deflecting material, such as in C-shaped portions 410, and first and second connecting strips 414, 416. Thus, compliance is met in three directions while maintaining axial rigidity.

Thus, in the above described couplers shown in FIGS. 33-35, only three degrees of freedom are allowed for the interface (coupler) giving the mechanism utilizing such a coupler a total of one degree of freedom, as in the prior embodiments, and thus such mechanisms are correctly constrained.

It should be understood that the interfaces described with respect to the above embodiments, whether they be joints, joint combinations, linkages, and/or couplers, will most likely be non-ideal interfaces. Although ideal interfaces are preferred, such perfection is sometimes unrealistic. In any interface, the most degrees of freedom that it could have is six. In the embodiments described herein, the interfaces have been constrained to only have three degrees of freedom. The other degrees of freedom that have been eliminated may actually exist, even if only to a very small degree. Thus, it should be understood that if movement of a joint is enabled past a tolerance for that degree of freedom, then it may be counted as a degree of freedom. The tolerance may be different depending on the type of movement for the degree of freedom and depending on the particular mechanism. For example only, if a tolerance of movement in one direction is 0.75 mm, and if movement of a joint in one direction is limited to no more than 0.5 mm, then the joint may be seen as constrained in that direction, and therefore that movement would not qualify as a degree of freedom. If, however, that same joint is movable in that direction more than 0.75 mm, then it would be considered to have a degree of freedom in that direction. In another example, if the tolerance of twisting in one direction is one degree, then any joint that twists for less than one degree would be considered constrained in that direction. In most cases, movement of a joint in a constrained direction, such as movement due to lash, is so negligible that the joint is easily recognizable as constrained in that direction, and therefore not a degree of freedom, and a joint having a degree of freedom in a particular direction is so obviously movable in that direction that it is easily recognizable as having a degree of freedom in that direction.

While the embodiments have been described with reference to exemplary embodiments, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the embodiments not be limited to the particular embodiment disclosed as the best mode contemplated for carrying out these embodiments, but that the embodiments will include all embodiments falling within the scope of the appended claims. Moreover, the use of the terms first, second, etc. do not denote any order or importance, but rather the terms first, second, etc. are used to distinguish one element from another.

The invention claimed is:

1. An actuator for a steering system, the actuator comprising:
   a rotary to linear actuator;
   a movable linear section; and,
   an interface between the rotary to linear actuator and the linear section and comprising a block on a plane joint, wherein the interface is limited to three degrees of freedom and the actuator is limited to one degree of freedom.

2. The actuator of claim 1 wherein the rotary to linear actuator includes a ballscrew screw and a ballscrew nut.

3. The actuator of claim 1 wherein the linear portion includes a rack.

4. The actuator of claim 1 wherein the degrees of freedom for the actuator is calculated using the equation:

$$d.o.f.=\lambda(L-J-1)+\Sigma f_i,$$

wherein $\lambda$ is degree of space;
L is number of links in the actuator;
J is number of joints in the actuator; and,
$f_i$ is degree of freedom for each individual joint in the actuator.

5. The actuator of claim 1 wherein the interface between the rotary to linear actuator and the linear section includes a portion of the rotary to linear actuator.

6. The actuator of claim 1 wherein the interface is limited to a single attachment to the linear section.

7. The actuator of claim 1 wherein the rotary to linear actuator includes a ballscrew screw and a ballscrew nut, and wherein the ballscrew nut is the block of the block on a plane joint.

8. The actuator of claim 7 further including a revolute joint and a cylindrical joint.

9. The actuator of claim 7 wherein the movable linear section is a rack, and wherein the plane of the block on a plane joint extends from the rack.

10. The actuator of claim 9 wherein a surface of the plane facing the ballscrew nut is at a non-perpendicular and non-zero angle with the rack.

11. The actuator of claim 10 wherein a face of the ballscrew nut facing the surface of the plane of the block on a plane joint is not perpendicular with an axis of the ballscrew screw.

12. The actuator of claim 10 wherein the face of the ballscrew nut deviates from being perpendicular with the axis of the ballscrew screw by less than ten degrees.

13. The actuator of claim 9 further comprising a connector connecting the plane to the rack.

14. The actuator of claim 7 wherein the plane of the block on a plane joint includes bearing surfaces engaging with ball bearings positioned between the ballscrew nut and the plane.

15. The actuator of claim 7 wherein the plane is an apertured element, and wherein the ballscrew screw passes through the plane.

16. The actuator of claim 9 wherein the plane of the block on a plane joint is a first plane, the actuator including a second plane, wherein the ballscrew nut is intermediate the first plane and the second plane, and wherein movement of the ballscrew nut in a first direction towards the first plane moves the linear section in the first direction, and wherein movement of the ballscrew nut in a second direction towards the second plane moves the linear section in the second direction.

17. The actuator of claim 16 wherein the first plane, ballscrew nut, and second plane are clamped together.

18. An interface for an actuator, the interface adjoining a movable linear section and a rotary to linear actuator,
wherein the interface comprises a block on a plane joint;
wherein the rotary to linear actuator includes a ballscrew screw and a ballscrew nut, wherein the block of the block on a plane joint is the ballscrew nut, and wherein forces between the ballscrew screw and the ballscrew nut are centered about a center of the ballscrew nut; and
wherein the plane of the block on a plane joint comprises a planar section extending from the movable linear section.

19. The interface of claim 18 wherein a surface of the planar section facing the ballscrew nut is at a non-perpendicular and non-zero angle with the linear section.

20. The interface of claim 19 wherein an angle between the ballscrew screw axis and a surface of the planar section facing the ballscrew nut is less than 90 degrees and greater than 81 degrees.

21. The interface of claim 18 wherein a face of the ballscrew nut facing a surface of the planar section is not perpendicular with an axis of the ballscrew screw.

22. The interface of claim 18 wherein the planar section and the ballscrew nut are clamped together, and wherein the movable linear section and the ballscrew nut are constrained from rotation about their longitudinal axes.

* * * * *